United States Patent
Liu et al.

(10) Patent No.: US 11,711,516 B2
(45) Date of Patent: Jul. 25, 2023

(54) INTRA PREDICTION USING POLYNOMIAL MODEL

(71) Applicants: Beijing Bytedance Network Technology Co., Ltd., Beijing (CN); Bytedance Inc., Los Angeles, CA (US)

(72) Inventors: Hongbin Liu, Beijing (CN); Li Zhang, San Diego, CA (US); Kai Zhang, San Diego, CA (US); Jizheng Xu, San Diego, CA (US); Yue Wang, Beijing (CN)

(73) Assignees: BEIJING BYTEDANCE NETWORK TECHNOLOGY CO., LTD, Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 17/338,552

(22) Filed: Jun. 3, 2021

(65) Prior Publication Data

US 2021/0297670 A1 Sep. 23, 2021

Related U.S. Application Data

(63) Continuation of application No. PCT/CN2019/127579, filed on Dec. 23, 2019.

(30) Foreign Application Priority Data

Dec. 21, 2018 (WO) ................ PCT/CN2018/122712

(51) Int. Cl.
*H04N 19/132* (2014.01)
*H04N 19/105* (2014.01)
(Continued)

(52) U.S. Cl.
CPC ......... *H04N 19/132* (2014.11); *H04N 19/105* (2014.11); *H04N 19/159* (2014.11);
(Continued)

(58) Field of Classification Search
CPC .. H04N 19/132; H04N 19/105; H04N 19/159; H04N 19/176; H04N 19/186; H04N 19/513; H04N 19/136
(Continued)

(56) References Cited

U.S. PATENT DOCUMENTS 8,767,817 B1 * 7/2014 Xu ........................ H04N 19/176
375/240
10,931,969 B2 2/2021 Chen et al.
(Continued)

FOREIGN PATENT DOCUMENTS

CN 1791216 A 6/2006
CN 101127914 A 2/2008
(Continued)

OTHER PUBLICATIONS

Bross et al. "Versatile Video Coding (Draft 2)," Joint Video Experts Team (JVET) of ITU-T SG 16 WP 3 and ISO/IEC JTC 1/SC 29/WG 11, 11th Meeting, Ljubljana, SI, Jul. 10-18, 2018, document JVET-K1001, 2018.
(Continued)

*Primary Examiner* — Marnie A Matt
(74) *Attorney, Agent, or Firm* — Perkins Coie LLP

(57) ABSTRACT

A method for video processing includes performing a conversion between a current video block and a bitstream representation of the current video block using an intra-prediction coding scheme based on an n-order polynomial model using at least one variable associated with the current video block, where n is an integer greater than or equal to zero, wherein the conversion includes generating the current video block from the bitstream representation or generating the bitstream representation from the current video block.

20 Claims, 21 Drawing Sheets

(51) Int. Cl.
*H04N 19/159* (2014.01)
*H04N 19/176* (2014.01)
*H04N 19/186* (2014.01)
*H04N 19/513* (2014.01)

(52) U.S. Cl.
CPC ......... *H04N 19/176* (2014.11); *H04N 19/186* (2014.11); *H04N 19/513* (2014.11)

(58) Field of Classification Search
USPC ........................................................ 375/240
See application file for complete search history.

(56) References Cited

U.S. PATENT DOCUMENTS

| | | | |
|---|---|---|---|
| 2008/0260031 A1* | 10/2008 | Karczewicz | H04N 19/176 375/E7.199 |
| 2009/0196342 A1* | 8/2009 | Divorra Escoda | H04N 19/159 375/E7.126 |
| 2011/0007800 A1* | 1/2011 | Zheng | H04N 19/136 375/E7.243 |
| 2016/0373765 A1* | 12/2016 | Zhang | H04N 19/59 |
| 2017/0085896 A1* | 3/2017 | Ramasubramonian | H04N 19/463 |
| 2017/0094285 A1* | 3/2017 | Said | H04N 19/593 |
| 2017/0180734 A1* | 6/2017 | Su | H04N 19/52 |
| 2018/0192072 A1* | 7/2018 | Chen | H04N 19/159 |
| 2019/0200023 A1 | 6/2019 | Hanhart et al. | |
| 2019/0238838 A1* | 8/2019 | Filippov | H04N 19/593 |
| 2019/0373267 A1* | 12/2019 | Said | H04N 19/593 |
| 2021/0195204 A1 | 6/2021 | Poirier et al. | |
| 2021/0297689 A1 | 9/2021 | Liu et al. | |
| 2022/0060749 A1* | 2/2022 | Kim | H04N 19/593 |

FOREIGN PATENT DOCUMENTS

| | | |
|---|---|---|
| CN | 105430403 A | 3/2016 |
| CN | 105635737 A | 6/2016 |
| CN | 105993175 A | 10/2016 |
| CN | 108141608 A | 6/2018 |
| CN | 108781282 A | 11/2018 |
| EP | 3105926 B1 | 4/2018 |
| WO | 2018070898 A1 | 4/2018 |
| WO | 2018129172 A1 | 7/2018 |

OTHER PUBLICATIONS

Chang et al. "CE3: Multiple Neighbor-based Linear Model (Test 4.1.3, 4.1 4, and 4.1.5)," Joint Video Experts Team (JVET) of ITU-T SG 16 WP 3 and ISO/IEC JTC 1/SC 29/WG 11, 11th Meeting, Ljubljana, SI, Jul. 10-18, 2018, document JVET-K0073, 2018.

Chen et al. Algorithm Description for Versatile Video Coding and Test Model 2 (VTM 2), Joint Video Experts Team (JVET) of ITU-T SG 16 WP 3 and ISO/IEC JTC 1/SC 29/WG 11, 11th Meeting, Ljubljana, SI, Jul. 10-18, 2018, document JVET-K1002, 2018.

Filippov et al. "CE3.7.2: Distance-Weighted Directional Intra Prediction," Joint Video Experts Team (JVET) of ITU-T SG 16 WP 3 and ISO/IEC JTC 1/SC 29/WG 11, 11th Meeting, Ljubljana, SI, Jul. 10-18, 2018, document JVET-K0045, 2018.

Laroche et al. "Non-CE3: On Cross-Component Linear Model Simplification," Joint Video Experts Team (JVET) of ITU-T SG 16 WP 3 and ISO/IEC JTC 1/SC 29/WG 11, 11th Meeting, Ljubljana, SI, Jul. 10-18, 2018, document JVET-K0204, 2018.

Huo et al. "Non-CE3: Current Luma Related-CCLM (CCCLM)," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0108, 2018.

Van Der Auwera et al. CE3: Simplified PDPC (Test 2.4.1); Joint Video Experts Team (JVET) of ITU-T SG 16 WP 3 and ISO/IEC JTC 29/WG 11, 11th Meeting, Ljubljana, SI, Jul. 10-18, 2018, document JVET-K0063, 2018.

International Search Report and Written Opinion from International Patent Application No. PCT/CN2019/127579 dated Mar. 12, 2020 (13 pages).

International Search Report and Written Opinion from International Patent Application No. PCT/CN2019/127580 dated Mar. 23, 2020 (10 pages).

Non-Final Office Action from U.S. Appl. No. 17/338,564 dated Mar. 30, 2022.

Notice of Allowance from U.S. Appl. No. 17/338,564 dated Oct. 26, 2022.

Chen et al. "Algorithm Description of Joint Exploration Test Model 4," oint Video Exploration Team (JVET) of ITU-T SG 16 WP 3 and ISO/IEC JTC 1/SC 29/WG 11 4th Meeting: Chengdu, CN, Oct. 15-21, 2016, document JVET-D1001, 2016. (cited in CN201980083815.1 OA1 dated Mar. 14, 2023).

* cited by examiner

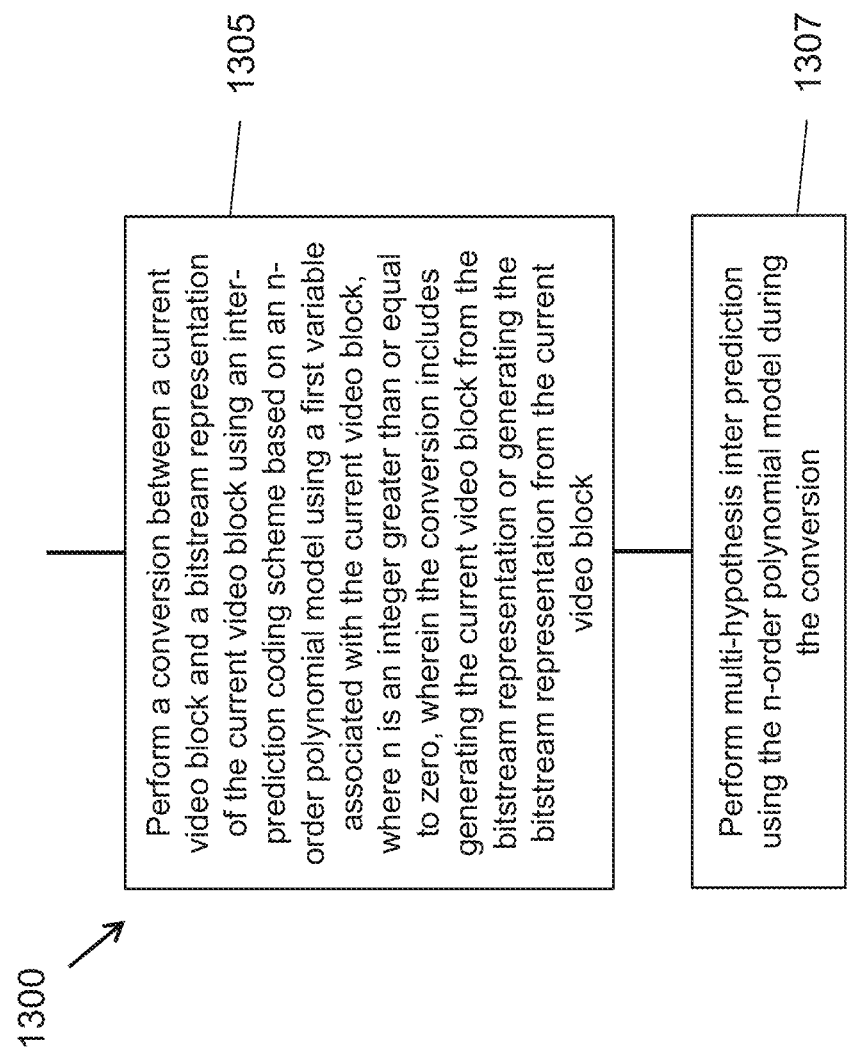

INTRA PREDICTION USING POLYNOMIAL MODEL

CROSS-REFERENCE TO RELATED APPLICATION

This application is a continuation of international No. PCT/CN2019/127579, filed on Dec. 23, 2019, which claims the priority to and benefits of International Patent Application No. PCT/CN2018/122712, filed on Dec. 21, 2018. All the aforementioned patent applications are hereby incorporated by reference in their entireties.

TECHNICAL FIELD

This document is related to video coding technologies.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

The disclosed techniques may be used by video decoder or encoder embodiments for in which interpolation is improved using a block-shape interpolation order technique.

In one example aspect, a method for processing video is disclosed. The method includes performing a conversion between a current video block and a bitstream representation of the current video block using an intra-prediction coding scheme based on an n-order polynomial model using at least one variable associated with the current video block, where n is an integer greater than or equal to zero, wherein the conversion includes generating the current video block from the bitstream representation or generating the bitstream representation from the current video block.

In another example aspect, a method for processing video includes performing a conversion between a current video block and a bitstream representation of the current video block using an intra-prediction coding scheme based on an n-order polynomial model using a first variable associated with the current video block, where n is an integer greater than or equal to zero, wherein the conversion includes generating the current video block from the bitstream representation or generating the bitstream representation from the current video block, wherein cross-component prediction is applied by using the n-order polynomial model.

In still another example aspect, a method for processing video is disclosed. The method includes performing a conversion between a current video block and a bitstream representation of the current video block using an inter-prediction coding scheme based on an n-order polynomial model using a first variable associated with the current video block, where n is an integer greater than or equal to zero, wherein the conversion includes generating the current video block from the bitstream representation or generating the bitstream representation from the current video block; and performing illumination compensation for the current video block using the n-order polynomial model during the conversion.

In yet another example aspect, a method for processing video is disclosed. The method includes performing a conversion between a current video block and a bitstream representation of the current video block using an inter-prediction coding scheme based on an n-order polynomial model using a first variable associated with the current video block, where n is an integer greater than or equal to zero, wherein the conversion includes generating the current video block from the bitstream representation or generating the bitstream representation from the current video block; and performing multi-hypothesis inter prediction using the n-order polynomial model during the conversion.

In yet another example aspect, the above-described methods may be implemented by a video decoder apparatus that comprises a processor.

In yet another example aspect, the above-described methods may be implemented by a video encoder apparatus comprising a processor for decoding encoded video during video encoding process.

In yet another example aspect, these methods may be embodied in the form of processor-executable instructions and stored on a computer-readable program medium.

These, and other, aspects are further described in the present document.

BRIEF DESCRIPTION OF THE DRAWINGS

FIG. 13 is a flowchart for an example of a method for processing video.

DETAILED DESCRIPTION

The present document provides various techniques that can be used by a decoder of video bitstreams to improve the quality of decompressed or decoded digital video. Furthermore, a video encoder may also implement these techniques during the process of encoding in order to reconstruct decoded frames used for further encoding.

Section headings are used in the present document for ease of understanding and do not limit the embodiments and techniques to the corresponding sections. As such, embodiments from one section can be combined with embodiments from other sections.

1. Summary

This document is related to video/image coding technologies. Specifically, it is related to intra prediction. It may be applied to the existing video coding standard like HEVC, or the next generation video coding standard Versatile Video Coding (VVC) to be finalized. It may also be applicable to future video coding standards or video codec.

2. Brief Discussion

To explore the future video coding technologies beyond HEVC, Joint Video Exploration Team (JVET) was founded by VCEG and MPEG jointly in 2015. Since then, many new methods have been adopted by JVET and put into the reference software named Joint Exploration Model (JEM). The Joint Video Experts Team (also named as JVET)—a collaborative team formed by the ITU-T Study Group 16 Video Coding Experts Group and ISO/IEC JTC1 SC29/ WG11 (Moving Picture Experts Group, MPEG)—has launched a project to develop a new video coding standard to be known as Versatile Video Coding (VVC). Work on the new VVC standard commenced at a meeting of the Joint Video Experts Team in San Diego, U.S., 10-20 Apr. 2018.

Figure 9:
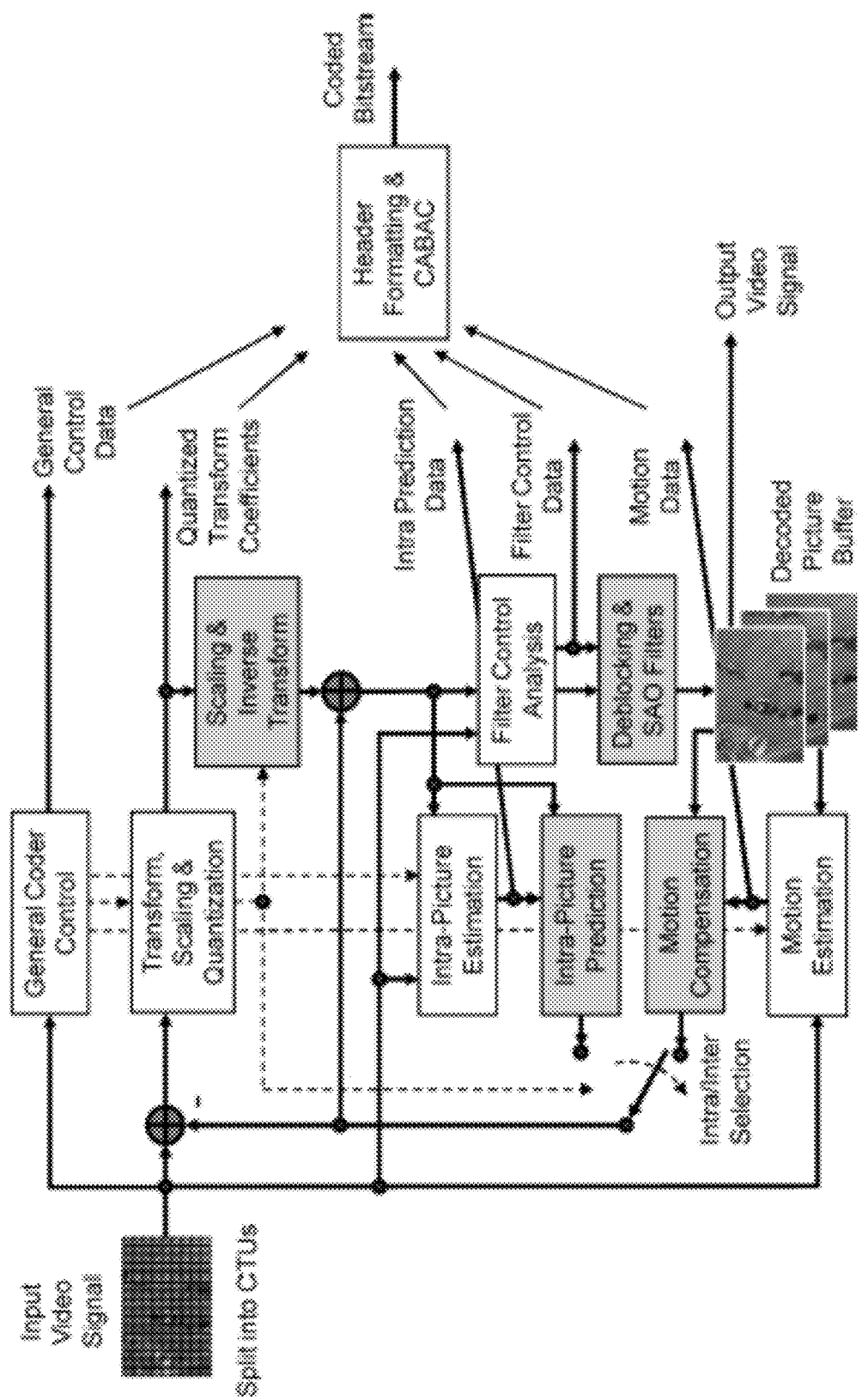
FIG. 9 shows a block diagram of an example implementation of a video encoder.

FIG. 9 is a block diagram of an example implementation of a video encoder.

2.1 Intra Mode Coding with 67 Intra Prediction Modes

To capture the arbitrary edge directions presented in natural video, the number of directional intra modes is extended from 33, as used in HEVC, to 65. The additional directional modes are depicted as arrows in FIG. 1, and the planar and DC modes remain the same. These denser directional intra prediction modes apply for all block sizes and for both luma and chroma intra predictions.

Figure 1:
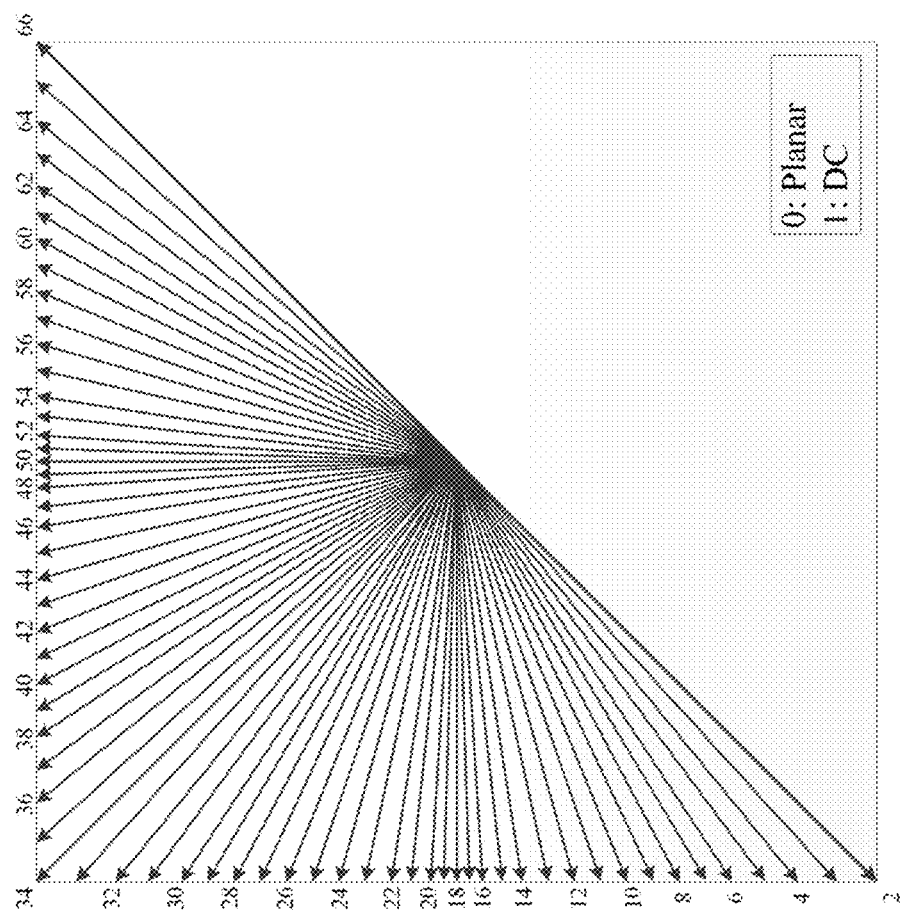
FIG. 1 is an illustration of intra prediction modes.

Conventional angular intra prediction directions are defined from 45 degrees to −135 degrees in clockwise direction as shown in FIG. 1. In VTM2, several conventional angular intra prediction modes are adaptively replaced with wide-angle intra prediction modes for the non-square blocks. The replaced modes are signaled using the original method and remapped to the indexes of wide angular modes after parsing. The total number of intra prediction modes is unchanged, i.e., 67, and the intra mode coding is unchanged.

In the HEVC, every intra-coded block has a square shape and the length of each of its side is a power of 2. Thus, no division operations are required to generate an intra-predictor using DC mode. In VVV2, blocks can have a rectangular shape that necessitates the use of a division operation per block in the general case. To avoid division operations for DC prediction, only the longer side is used to compute the average for non-square blocks.

2.2 Wide-Angle Intra Prediction for Non-Square Blocks

Conventional angular intra prediction directions are defined from 45 degrees to −135 degrees in clockwise direction. In VTM2, several conventional angular intra prediction modes are adaptively replaced with wide-angle intra prediction modes for non-square blocks. The replaced modes are signaled using the original method and remapped to the indexes of wide angular modes after parsing. The total number of intra prediction modes for a certain block is unchanged, i.e., 67, and the intra mode coding is unchanged.

Figure 2:
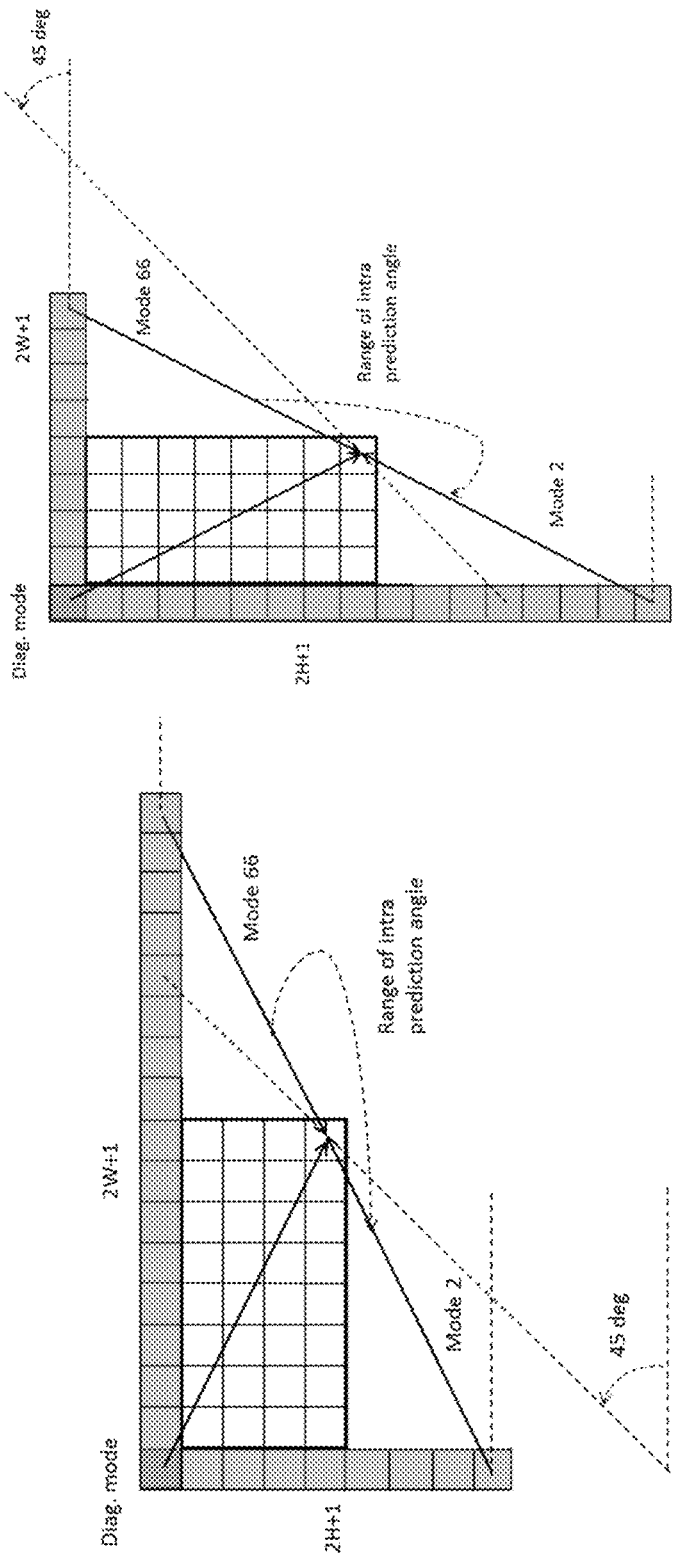
FIG. 2 shows an example of reference samples for wide-angular intra prediction.

To support these prediction directions, the top reference with length 2 W+1, and the left reference with length 2H+1, are defined as shown in FIG. 2.

The mode number of replaced mode in wide-angular direction mode is dependent on the aspect ratio of a block. The replaced intra prediction modes are illustrated in Table 2-1.

TABLE 2-1

Intra prediction modes replaced by wide-angular modes

| Condition | Replaced intra prediction modes |
| --- | --- |
| W/H == 2 | Modes 2,3,4,5,6,7 |
| W/H > 2 | Modes 2,3,4,5,6,7,8,9,10,11 |
| W/H == 1 | None |
| H/W == 1/2 | Modes 61,62,63,64,65,66 |
| H/W < 1/2 | Mode 57,58,59,60,61,62,63,64,65,66 |

Figure 3:
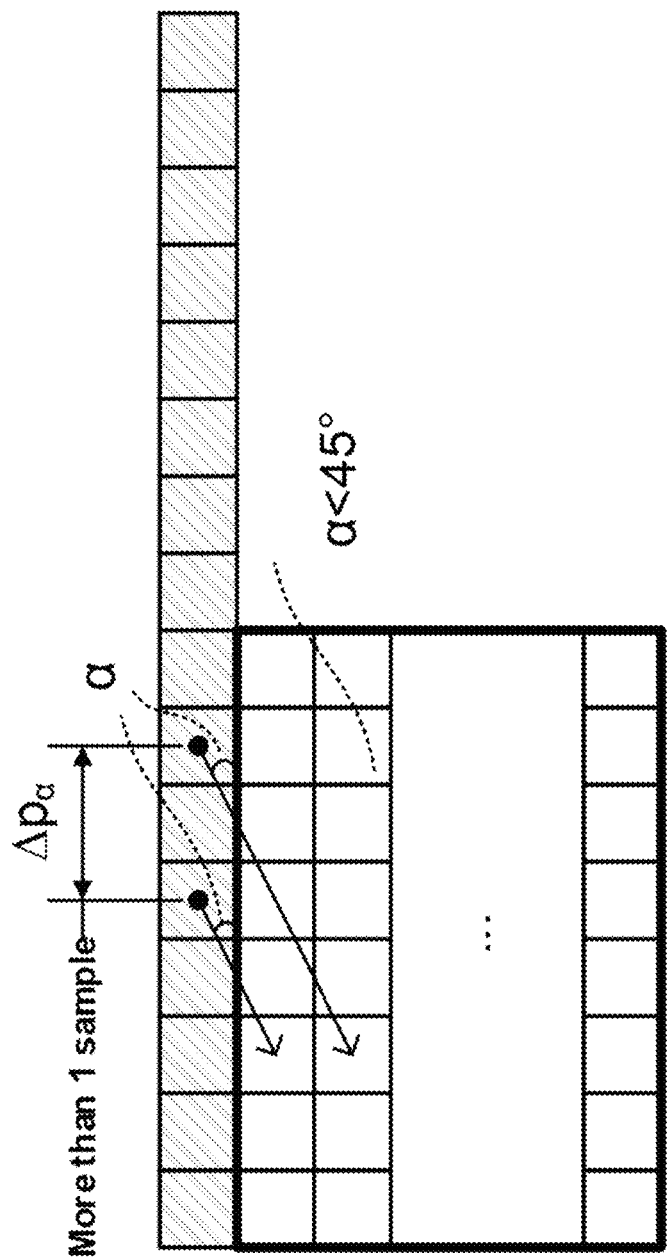
FIG. 3 shows an example of discontinuity in case of directions beyond 45 degrees.

As shown in FIG. 3, two vertically-adjacent predicted samples may use two non-adjacent reference samples in the case of wide-angle intra prediction. Hence, low-pass reference samples filter and side smoothing are applied to the wide-angle prediction to reduce the negative effect of the increased gap $\Delta p_a$.

2.3 Position Dependent Intra Prediction Combination

In the VTM2, the results of intra prediction of planar mode are further modified by a position dependent intra prediction combination (PDPC) method. PDPC is an intra prediction method which invokes a combination of the un-filtered boundary reference samples and HEVC style intra prediction with filtered boundary reference samples. PDPC is applied to the following intra modes without signalling: planar, DC, horizontal, vertical, bottom-left angular mode and its eight adjacent angular modes, and top-right angular mode and its eight adjacent angular modes.

The prediction sample pred(x,y) is predicted using an intra prediction mode (DC, planar, angular) and a linear combination of reference samples according to the Equation as follows:

$$\text{pred}(x,y), (wL \times R_{-1,y} + wT \times R_{x,-1} - wTL \times R_{-1,-1} + (64 - wL - wT + wTL) \times \text{pred}(x,y) + 32)$$

where $R_{x,-1}$, $R_{-1,y}$ represent the reference samples located at the top and left of current sample (x, y), respectively, and $R_{-1,-1}$ represents the reference sample located at the top-left corner of the current block.

If PDPC is applied to DC, planar, horizontal, and vertical intra modes, additional boundary filters are not needed, as required in the case of HEVC DC mode boundary filter or horizontal/vertical mode edge filters.

Figure 4:
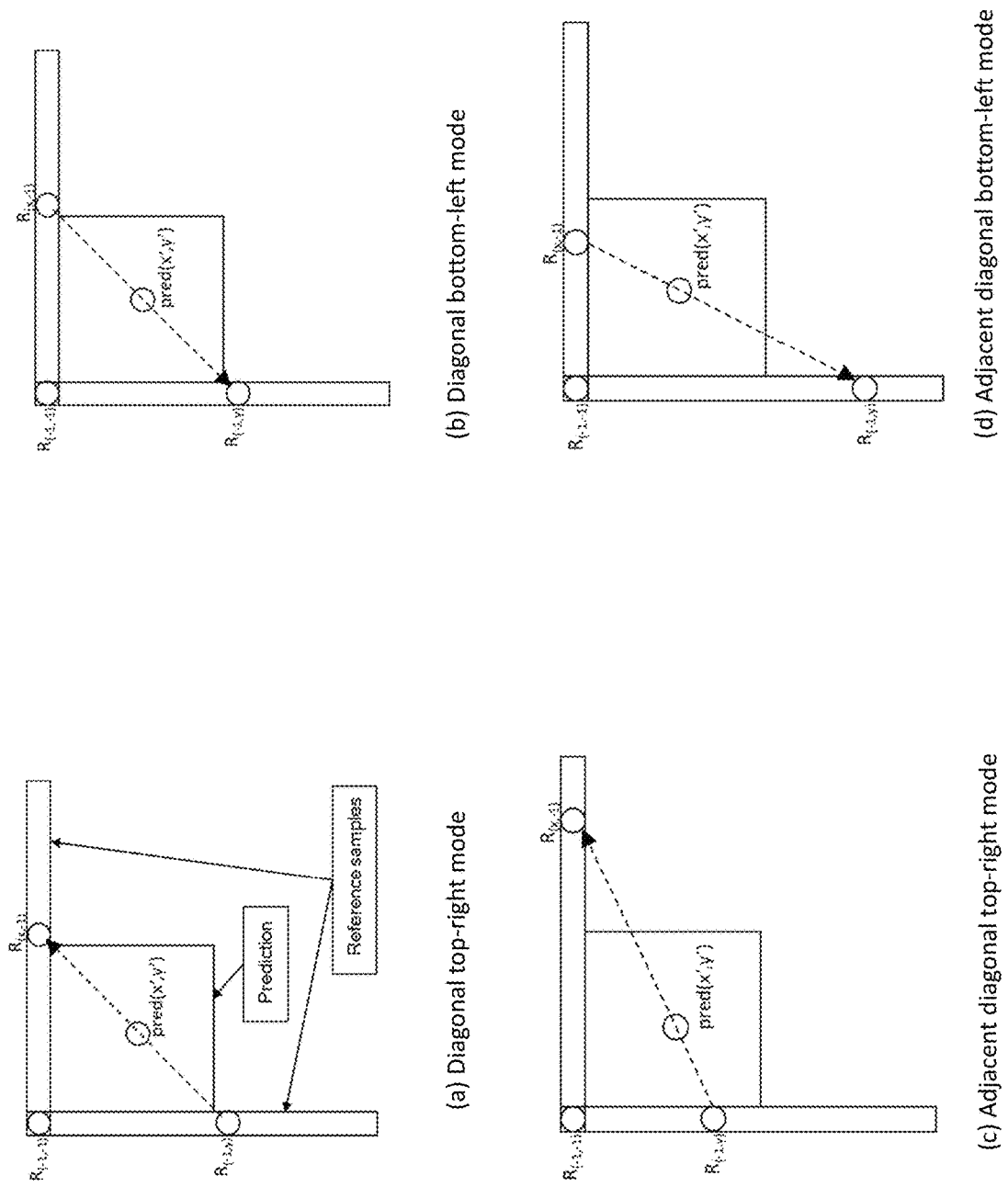
FIG. 4 shows examples of samples used by position dependent intra prediction combination (PDPC) applied to diagonal and adjacent angular intra modes.

FIG. 4 illustrates the definition of reference samples ($R_{x,-1}$, $R_{-1,y}$ and $R_{-1,-1}$) for PDPC applied over various prediction modes. The prediction sample pred (x', y') is located at (x', y') within the prediction block. The coordinate x of the reference sample $R_{x,-1}$ is given by: x=x'+y'+1, and the coordinate y of the reference sample $R_{-1,y}$ is similarly given by: y=x'+y'+1.

The PDPC weights are dependent on prediction modes and are shown in Table 2-2.

TABLE 2-2

Example of PDPC weights according to prediction modes

| Prediction modes | wT | wL | wTL |
| --- | --- | --- | --- |
| Diagonal top-right | 16 >> (( y' << 1 ) >> shift ) | 16 >> (( x' << 1 ) >> shift ) | 0 |
| Diagonal bottom-left | 16 >> (( y' << 1 ) >> shift ) | 16 >> (( x' << 1 ) >> shift ) | 0 |
| Adjacent diagonal top-right | 32 >> (( y' << 1 ) >> shift ) | 0 | 0 |

TABLE 2-2-continued

Example of PDPC weights according to prediction modes

| Prediction modes | wT | wL | wTL |
|---|---|---|---|
| Adjacent diagonal bottom-left | 0 | 32 >> (( x' << 1 ) >> shift ) | 0 |

3. Examples of Problems Solved by Embodiments

When performing intra prediction, usually, linear model is used. Higher-order polynomial models are not used.

4. Examples of Embodiments

The detailed techniques below should be considered as examples to explain general concepts. These techniques should not be interpreted in a narrow way. Furthermore, these techniques can be combined in any manner.

Suppose the n-order polynomial model in one variable is $$f(x) = \sum_{k=0}^{n} a_k x^k,$$

and the n-order polynomial model in two variables is $$f(x, y) = \sum_{k=0}^{n} a_k x^k + \sum_{k=0}^{n} b_k y^k + \sum_{k=1}^{n-1} c_k x^k y^{n-k}.$$

Figure 5:
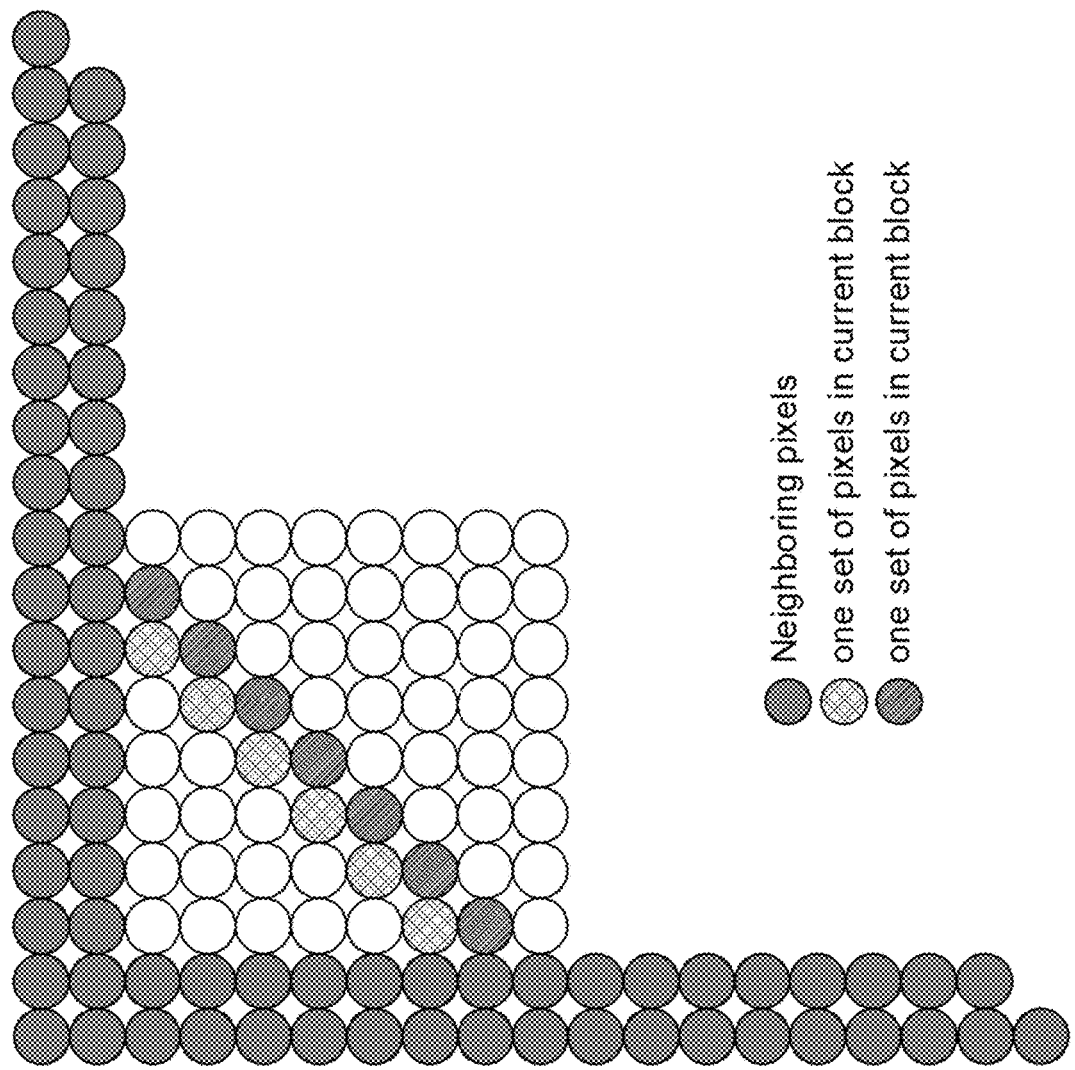
FIG. 5 shows an example of using a polynomial model for intra prediction.
Figure 6B:
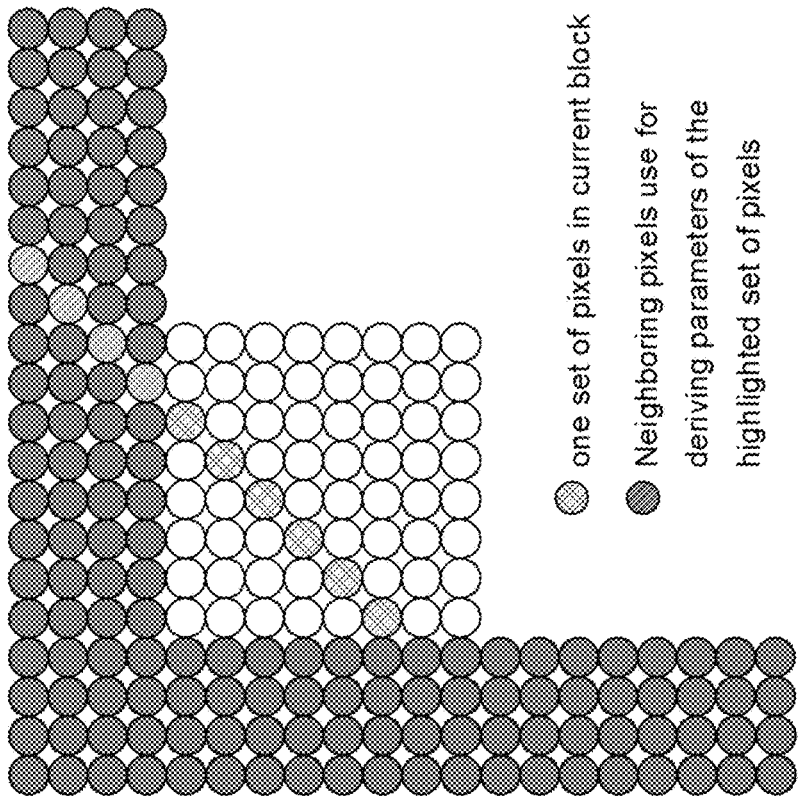
FIGS. 6A-6H show examples of neighboring samples used for deriving parameters of a polynomial model.
Figure 6A:
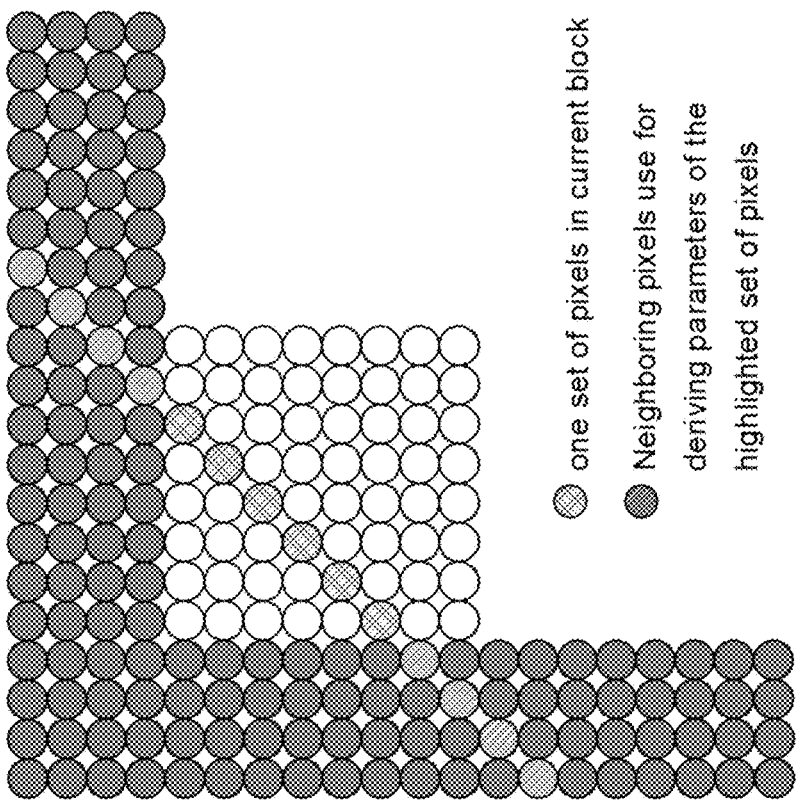
Figure 6D:
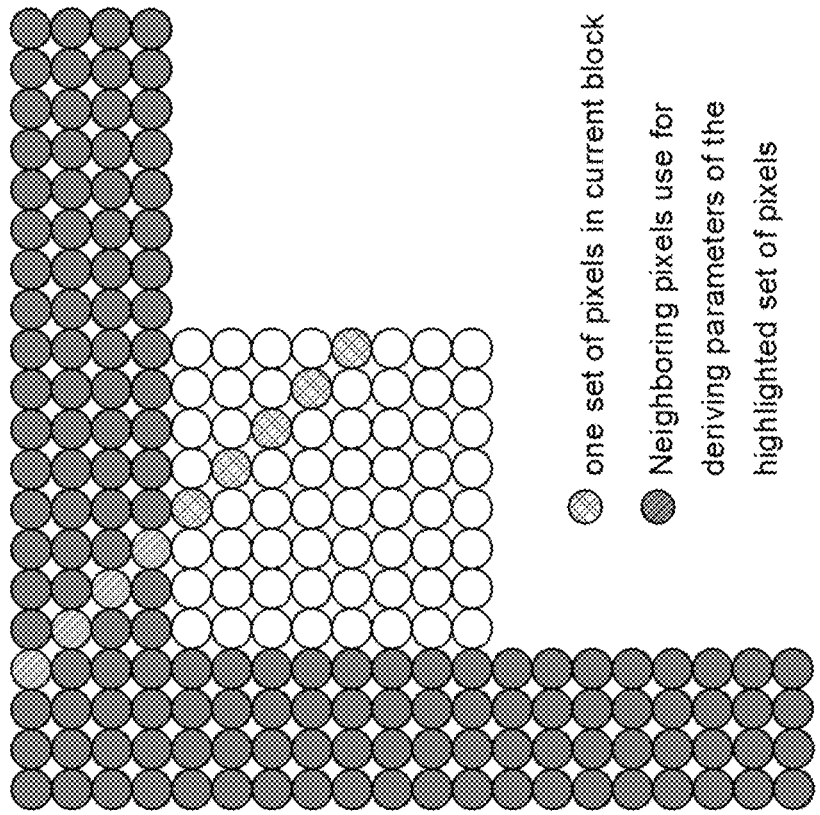
Figure 6C:
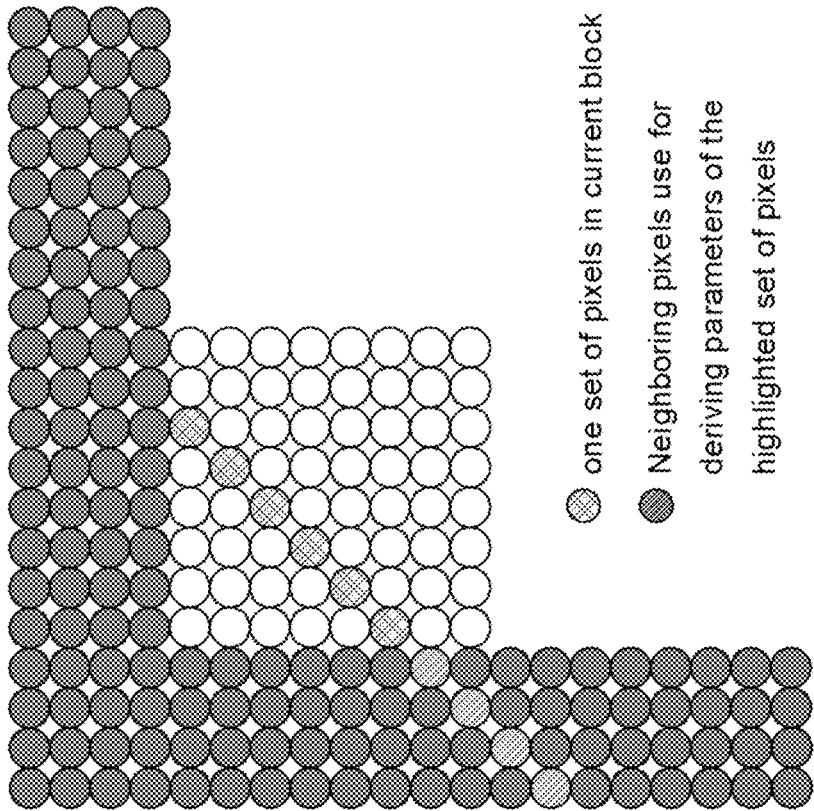
Figure 6F:
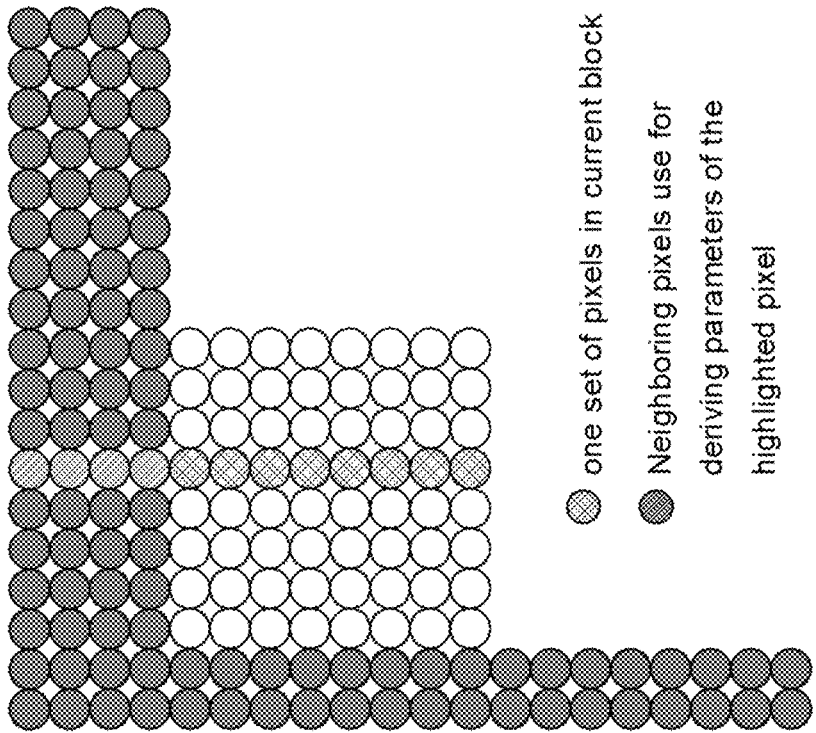
Figure 6E:
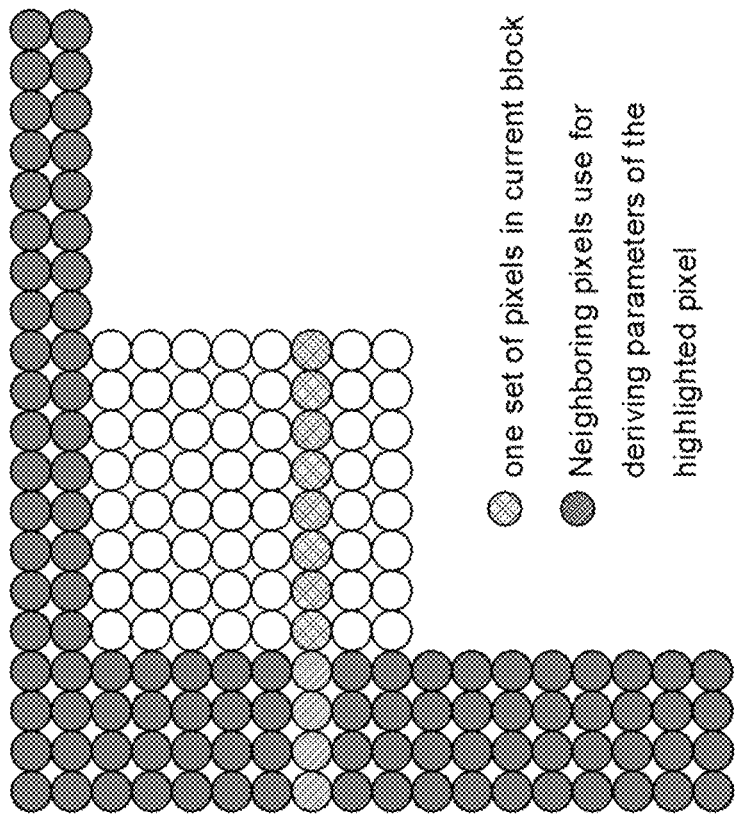
Figure 6H:
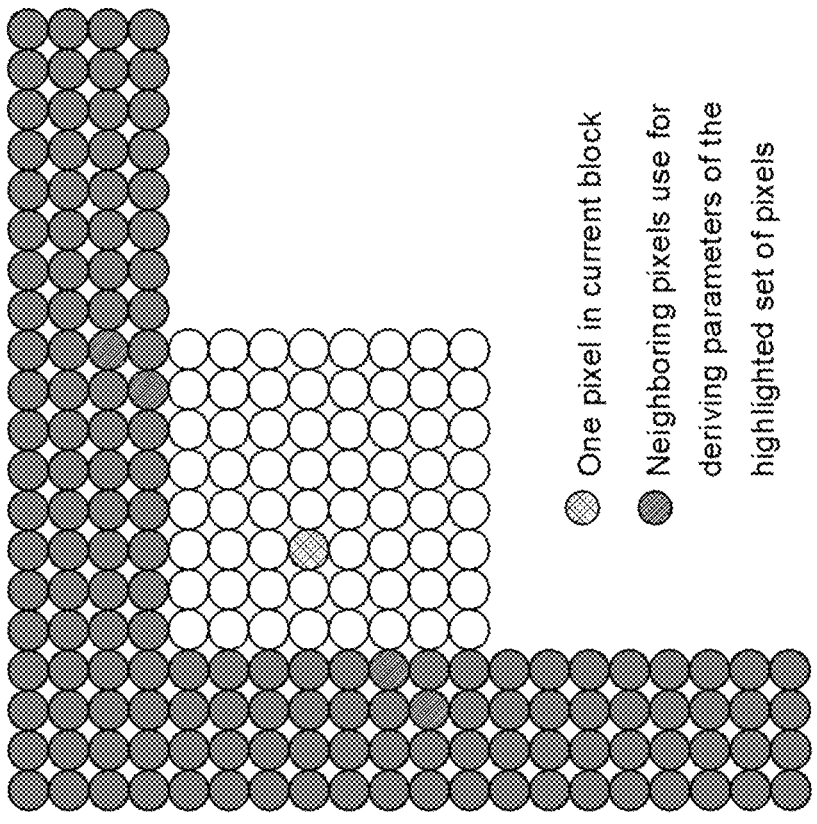
Figure 6G:
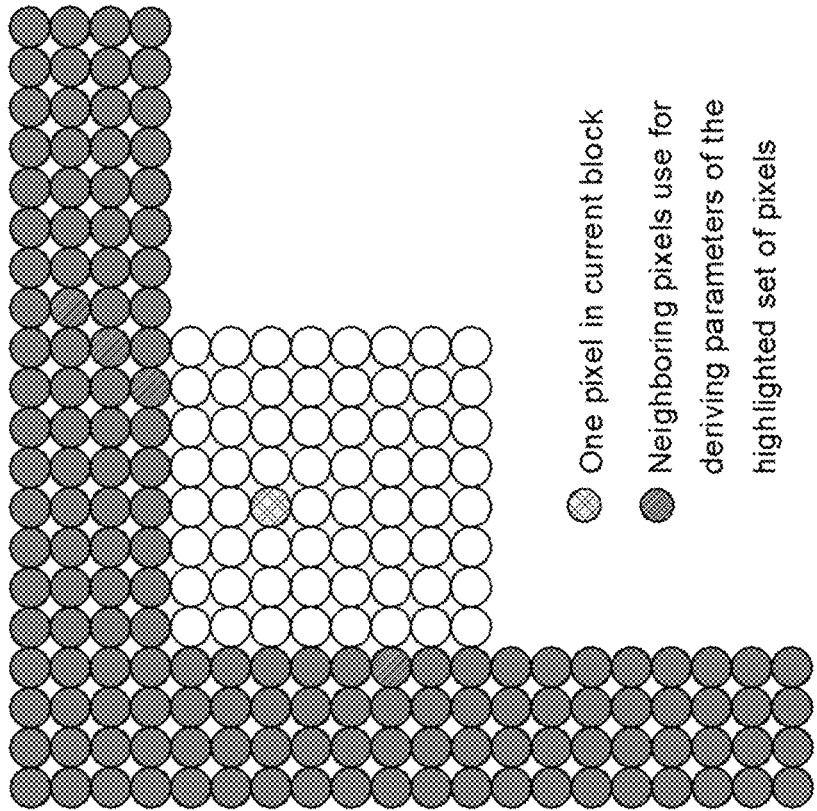
Figure 7B:
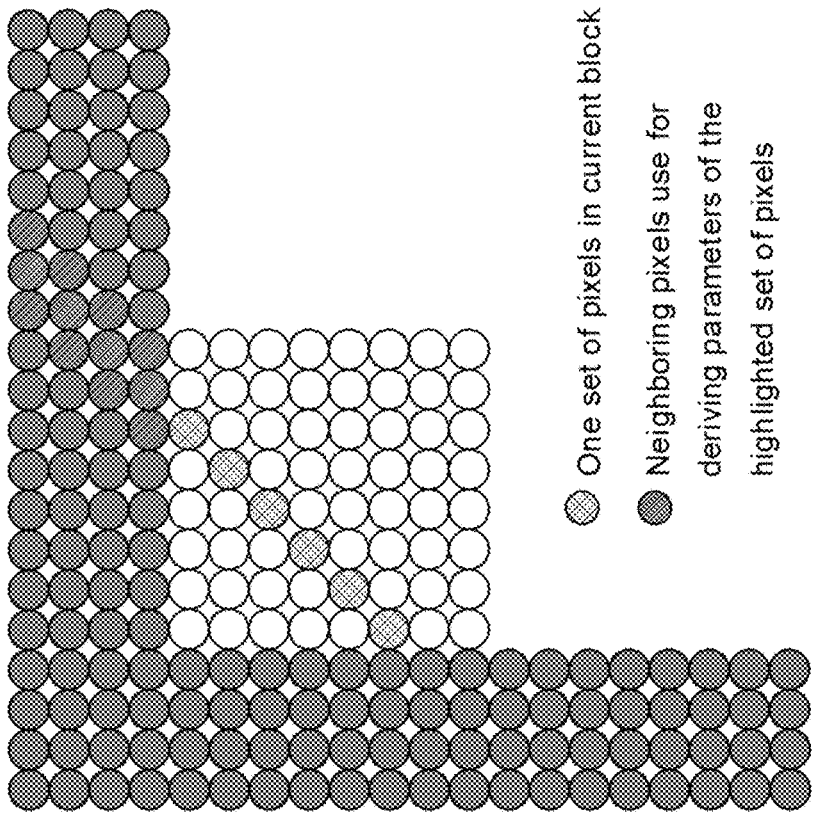
FIGS. 7A-7K show examples of neighboring samples used for deriving parameters of a polynomial model.
Figure 7A:
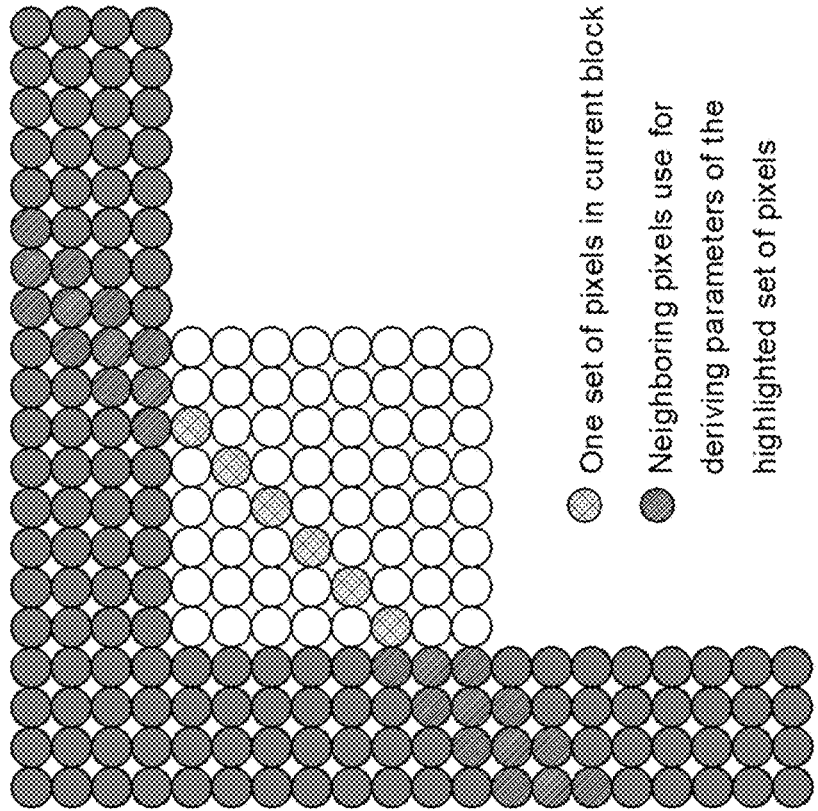
Figure 7D:
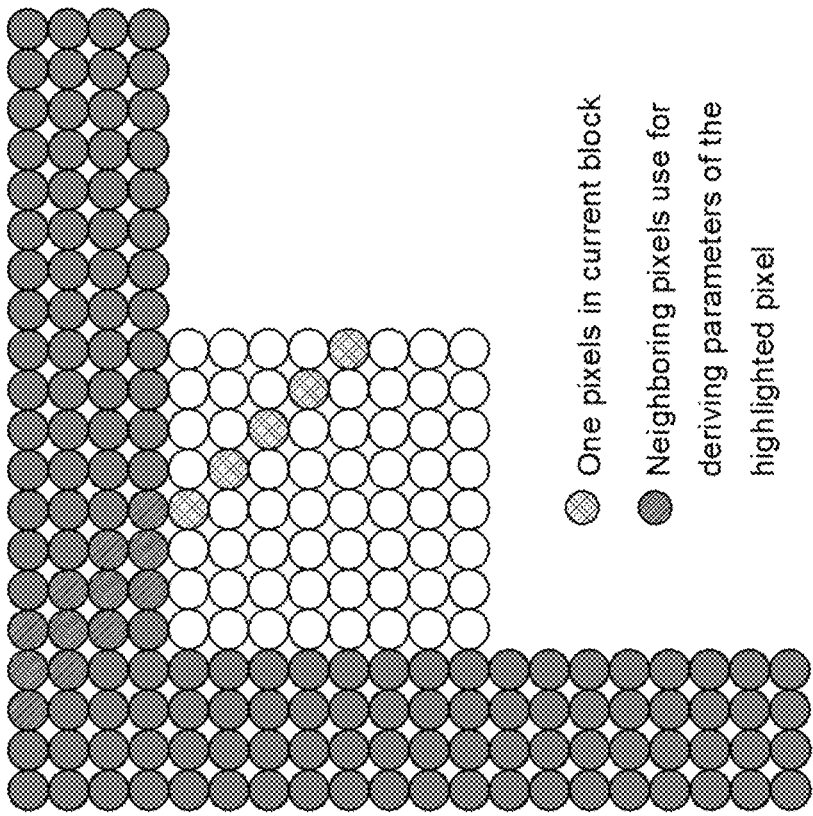
Figure 7C:
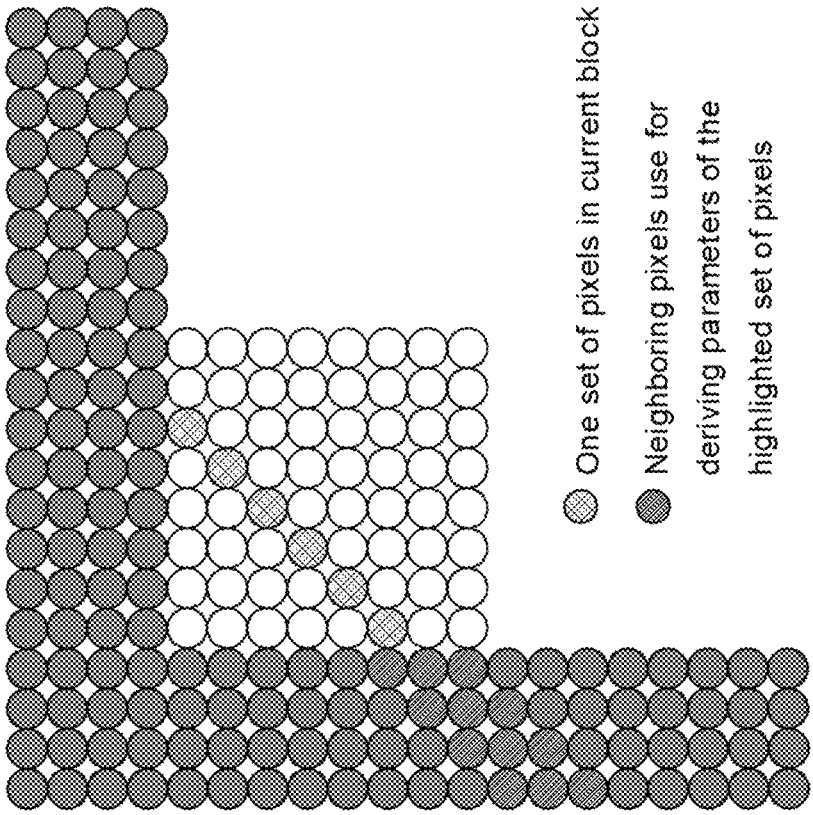
Figure 7F:
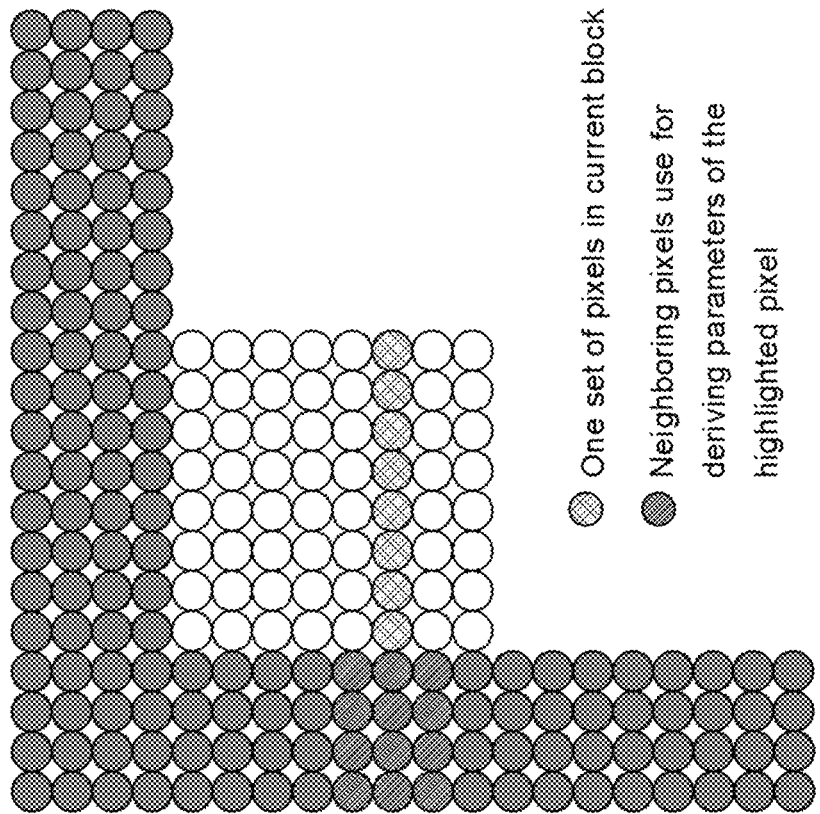
Figure 7E:
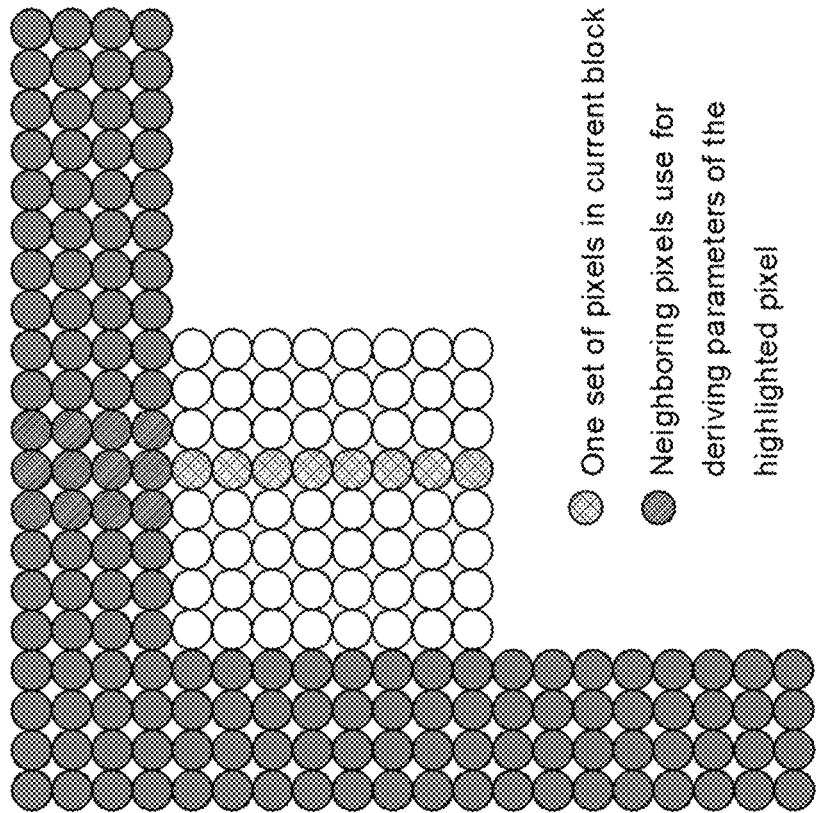
Figure 7H:
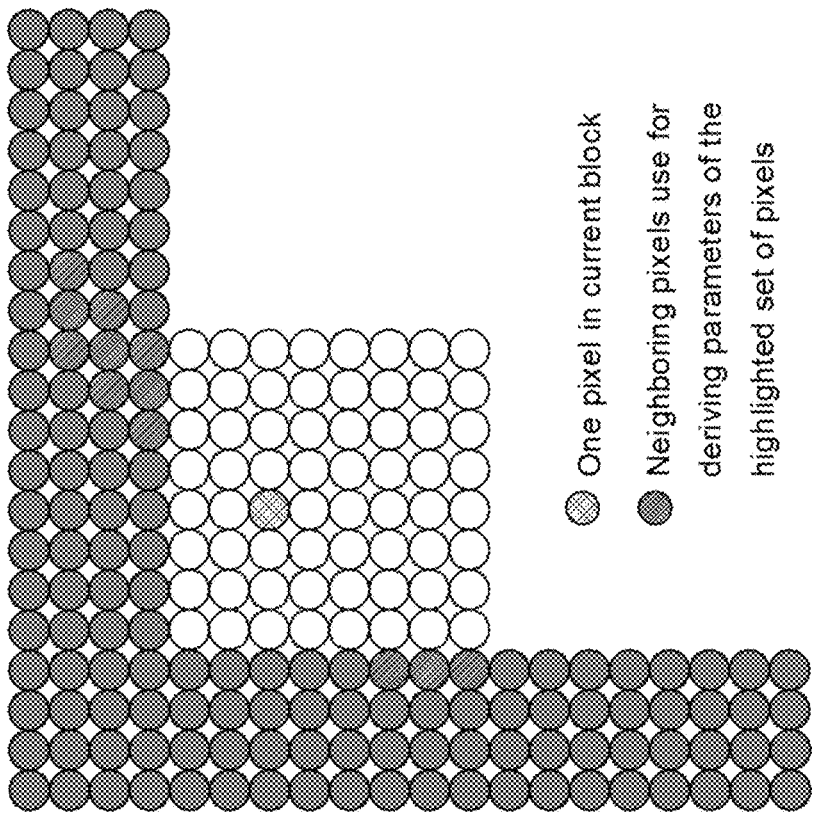
Figure 7G:
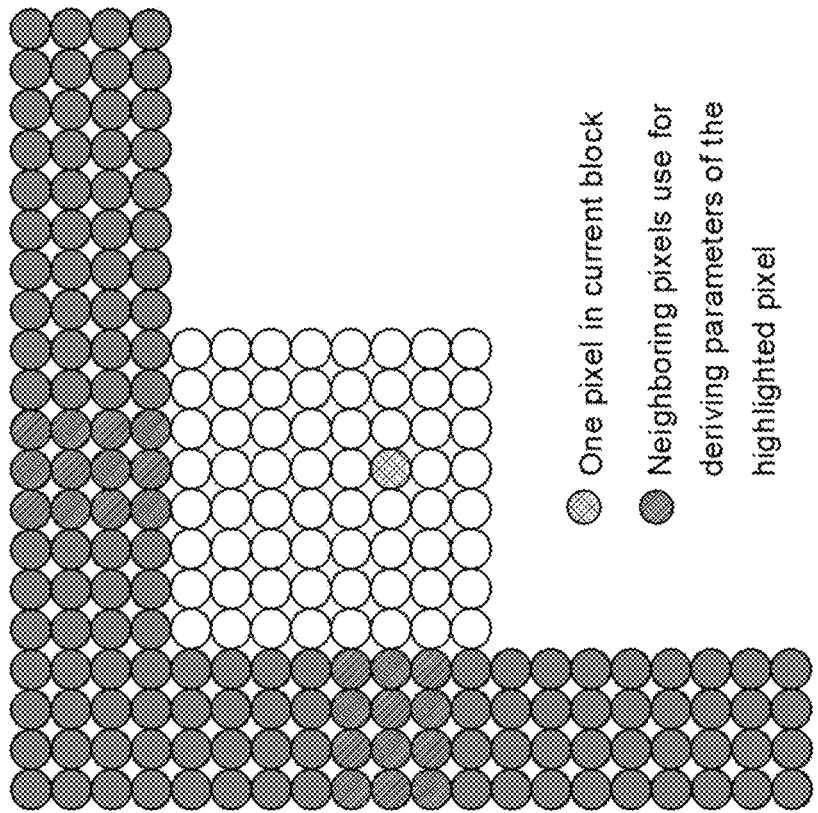
Figure 7J:
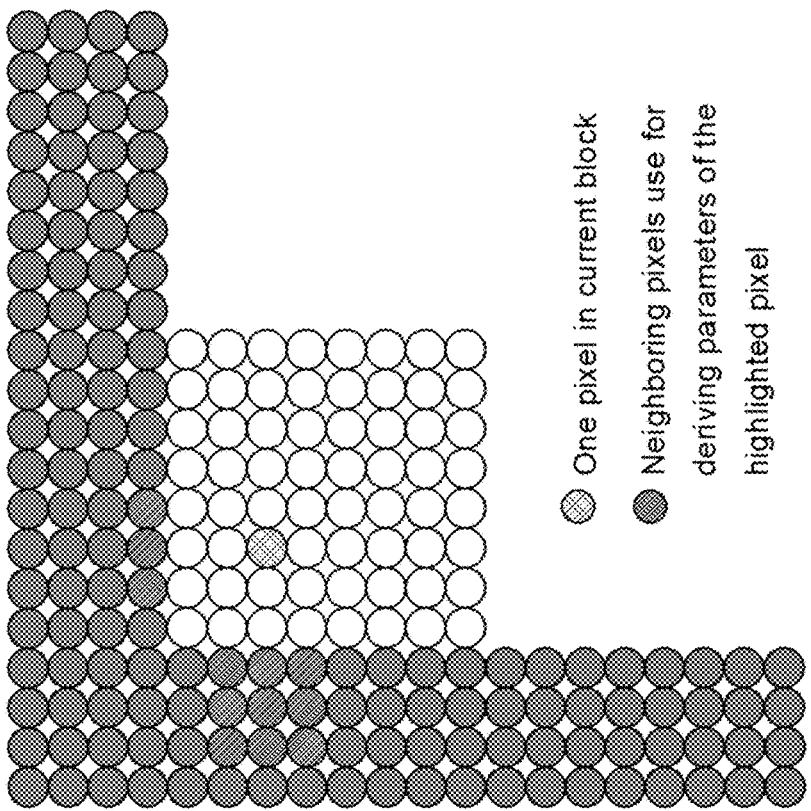
Figure 7I:
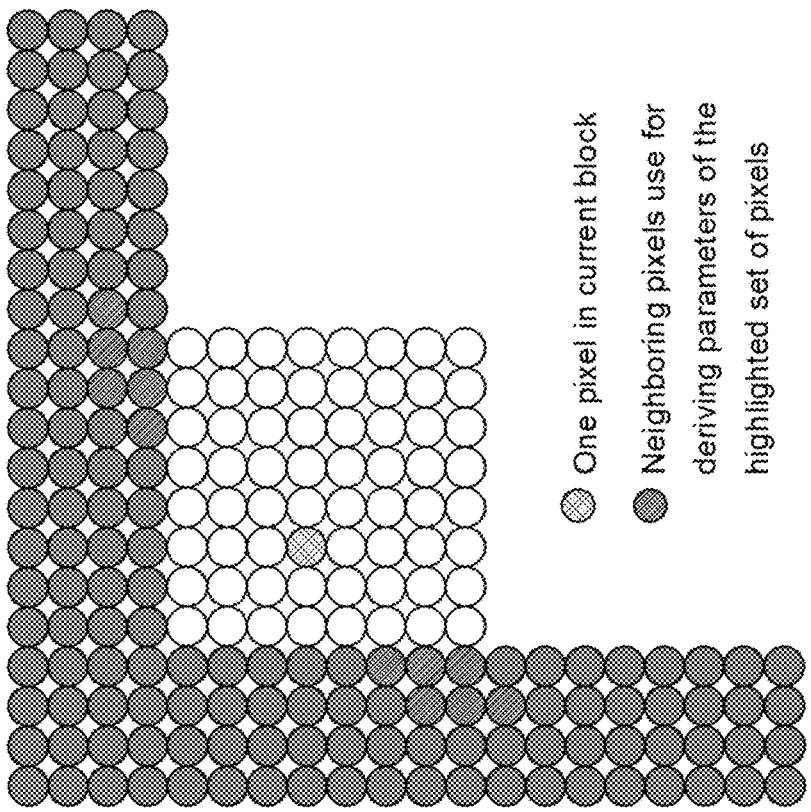
Figure 7K:
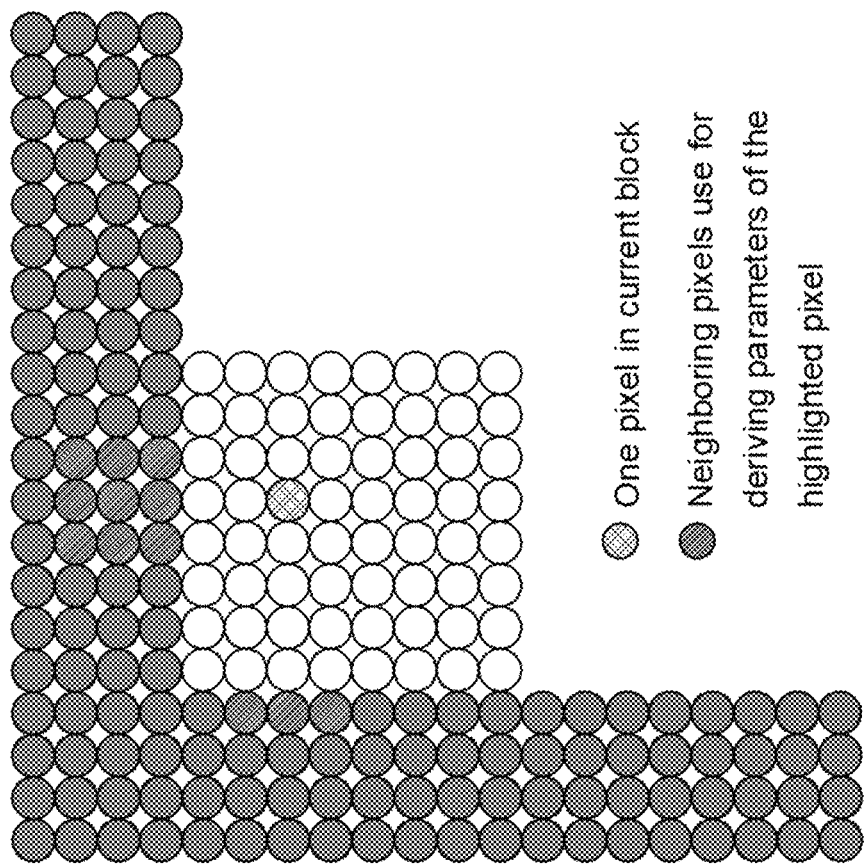

Here, $a_k$, $b_k$, $c_k$ indicates the k-th weighting factor associated with $x^k$, $y^k$, $x^k y^{n-k}$, respectively.

n-Order Polynomial Model in One Variable
1. It is proposed that n-order polynomial model in one variable may be used for intra prediction, wherein n >=0.
   a. In one example, x may represent the distance between the sample to be predicted and the left boundary of the current block along the horizontal direction;
   b. In one example, x may represent the distance between the sample to be predicted and the top boundary of the current block along the vertical direction;
   c. In one example, x may represent the distance between the sample to be predicted and the left or top boundary of the current block along the angular prediction direction as illustrated in FIG. 5;
   d. In one example, multiple sets of parameters may be derived for the polynomial model, and each set of parameters is applied to one set of samples.
      i. For example, one set of samples may be defined to be samples in the same line along a certain prediction direction, an example is illustrated in FIG. 5.
   e. In one example, a set of parameters may be derived for each sample within the current block.
   f. In one example, n is equal to 3 and $f(x)=a_0+a_1 x+a_2 x^2+a_3 x^3$.
   g. In one example, n is equal to 2 and $f(x)=a_0+a_1 x+a_2 x^2$.
   h. In one example, some parameters (for example, $a_0$) may be assumed to be zero and are not derived.
2. It is proposed that different sets of neighboring samples may be used when deriving different sets of parameters for the polynomial model.
   a. In one example, M (M>0) neighboring samples along a given prediction direction may be used to derive one set of parameters, an example is illustrated in FIG. 6A-D. In this case, x may be defined as the (relative) position along the prediction direction.
   b. In one example, M neighboring samples within the same row or/and neighboring samples within the same column of the current sample may be used to derive one set of parameters, an example is illustrated in FIG. 6E and FIG. 6F. In this case, x may be defined as the (relative) horizontal (or vertical) position of the sample.
   c. In one example, for a prediction direction, if there are available neighboring samples in both the above row and the left column, different sets of parameters may be derived for samples in the same prediction line. An example is illustrated in FIGS. 6G and 6H.
   d. In one example, N+1 (i.e., M=N+1) neighboring samples may be used for deriving parameters of N-order polynomial model.
   e. In one example, more than N+1 (i.e., M>N+1) neighboring samples may be used for deriving parameters of N-order polynomial model.
   f. In one example, M may be different for different sets of samples.
   g. In one example, neighboring samples used for deriving polynomial model parameters may be selected according to the distance between the neighboring samples and the sample to be predicted.
   h. It is proposed that whether and how to derive parameters from neighbouring reconstructed samples may depend on whether specific neighbouring reconstructed samples are available or not.
      i. A neighbouring reconstructed sample may be marked as "unavailable" if it has not been decoded yet.
      ii. A neighbouring reconstructed sample may be marked as "unavailable" if it is not in the same slice/tile group/tile/CTU line.
      iii. A neighbouring reconstructed sample may be marked as "unavailable" if it is not intra-coded.

n-Order Polynomial Model in Two Variables
3. It is proposed that n-order polynomial model in two variables may be used for intra prediction, wherein n >=0.
   a. In one example, one sets of parameters may be derived for the polynomial model and is applied to all samples.
   b. In one example, multiple sets of parameters may be derived for the polynomial model, and each set of parameters is applied to one set of samples.
   c. In one example, a set of parameters may be derived for each sample within the current block.
   d. In one example, x may represent the distance between the sample to be predicted and the left boundary of the current block along the horizontal direction; y may represent the distance between the sample to be predicted and the top boundary of the current block along the vertical direction;
   e. In one example, x may represent the distance between the sample to be predicted and the left or top boundary of the current block along the angular prediction direction as illustrated in FIG. 5; y may represent the distance between the sample to be predicted and the left or top boundary of the current block along the direction perpendicular to the angular prediction direction;
    f. In one example, some parameters (for example, $c_k$) may be assumed to be zero and are not derived.
4. It is proposed that different sets of neighboring samples may be used when deriving different sets of parameters for the polynomial model.
    g. In one example, M neighboring samples around a given prediction direction may be used to derive one set of parameters, an example is illustrated in FIGS. 7A-7D.
    h. In one example, M neighboring samples around one row or/and column may be used to derive one set of parameters for each sample, an example is illustrated in FIGS. 7E-F.
    i. In one example, for a prediction direction, if there are available neighboring samples in both above row and left column, different sets of parameters may be derived for samples in the same prediction line. An example is illustrated in FIGS. 7G-7K.
    j. In one example, M may be different for different sets of samples.
    k. In one example, only parameters $a_k$ and $b_k$ are derived and parameter $c_k$ are assumed to be zero.
    l. In one example, neighboring samples used for deriving polynomial model parameters may be selected according to the distance between the neighboring samples and the sample to be predicted.
    m. In one example, neighboring samples used for deriving polynomial model parameters may be selected according to the intra prediction modes.

n-Order Polynomial Model for Cross-Component Prediction

5. It is proposed that n-order polynomial model (e.g., in one variable) may be used for cross-component prediction, wherein n >=0.
    a. In one example, x may represent the sample value of one color component (e.g., Cb) and f(x) may represent the sample value of another color component (e.g. Y).
    b. When deriving parameters of the polynomial model, x may represent neighboring sample values of one color component (e.g., Cb) and f(x) may represent the corresponding neighboring sample values of another color component (e.g. Y).
    c. In one example, the sample values may be processed by filters before being used for deriving parameters of the polynomial model.
    d. In one example, different parameters may be derived for different color components such as Y, Cb and Cr.

n-Order Polynomial Model for Illumination Compensation

6. It is proposed that n-order polynomial model (e.g., in one variable) may be used for illumination compensation, wherein n >=0. Suppose MV of current blocks is my.
    a. In one example, x may represent the reference sample value and f(x) may represent the predicted sample value.
    b. When deriving parameters of the polynomial model, f(x) may represent the sample value of one neighboring sample and x may represent the sample value of its corresponding reference sample identified by my.
        i. Alternatively, f(x) may represent the sample value of one neighboring sample and x may represent the sample value of its corresponding reference sample identified by modified my, for example, integer part of my.
    c. In one example, the sample values may be processed by filters before being used for deriving parameters of the polynomial model.
    d. In one example, different parameters may be derived for different color components such as Y, Cb and Cr.

n-Order Polynomial Model for Multi-Hypothesis Inter Prediction

7. It is proposed that n-order polynomial model (e.g., in one variable) may be used for multi-hypothesis inter prediction, wherein n >=0.
    a. In one example, x may represent the temporal distance between a reference picture and the current picture, and f(x) may represent the predicted sample value or/and reference sample value of some color component.
    b. When deriving parameters of the polynomial model, only reference sample values are used.
    c. In one example, the sample values may be processed by filters before being used for deriving parameters of the polynomial model.
    d. In one example, different parameters may be derived for different color components such as Y, Cb and Cr.

Other Parts

8. It is proposed that neighboring samples may be processed by filters before being used for deriving parameters of the polynomial model.
9. It is proposed that neighboring samples in fractional positions may be used for deriving parameters of the polynomial model, and such neighboring samples may be interpolated by using neighboring samples in integer positions.
10. The parameters (e.g., $a_k$, $b_k$, $c_k$) of the polynomial model may be derived from one color component, and utilized for coding/decoding another color component.
    a. Alternatively, furthermore, the parameters may be fixed for all samples within one block.
11. The neighboring samples may be firstly downsampled before being used for deriving parameters of the polynomial model.
12. Polynomial model-based intra prediction method may be treated as a new intra prediction mode in addition to current existing intra prediction mode (e.g., 67 modes in VVC).
    b. Alternatively, Polynomial model-based intra prediction method may be treated as a new way to derive intra prediction blocks in addition to conventional ways. In this case, for each intra prediction mode, or partial of allowed intra prediction modes, it may select whether to use the polynomial model-based intra prediction method or not.
13. A polynomial model on/off flag may be signaled at block/CU/slice header/tile header/VPS/PPS/SPS to indicate whether proposed method is employed or not.
    a. In one example, when encoding the block/CU level polynomial model flag, context adaptive arithmetic binary coding may be used, and one or more context may be used.
        i. For example, one context is used.
        ii. For example, more than one contexts may be used, and selection of the context may depend on the polynomial model flag of neighboring blocks.
    b. In one example, for a decoded intra prediction mode, this flag may be further coded/decoded to tell whether the conventional intra prediction method or polynomial model-based intra prediction method is utilized for decoding the current block.
  c. In one example, such a flag may be firstly decoded before decoding the intra prediction mode. If this flag indicates that polynomial model-based intra prediction method is utilized for decoding the current block, there is no need to further decode the intra prediction mode. In this case, polynomial model-based intra prediction method is treated as a new intra prediction mode.
14. Some parameters of the polynomial model may be assumed to be default values (e.g., zero) and are not derived.
15. The above methods may be applied under certain conditions and may be implicitly disabled in other cases.
  d. For example, it may be applied for certain color components, e.g., only luma color component.
  e. For example, it may be applied for certain block size/block shape etc. al
  f. For example, it may be applied for certain intra prediction modes and disallowed for other remaining intra prediction modes.
  g. When it is disallowed under other conditions, the indication of above methods are not signaled.
16. The results of n-order polynomial model may be further clipped before being used as the prediction values.
  c. In one example, $$f(x) = \text{Clip3}\left(\left(\sum_{k=0}^{n} a_k x^k + \text{off}\right) \gg S\right),$$

$$f(x, y) = \text{Clip3}\left(\left(\sum_{k=0}^{n} a_k x^k + \sum_{k=0}^{n} b_k y^k + \sum_{k=1}^{n-1} c_k x^k y^{n-k} + \text{off}\right) \gg S\right),$$

where off may be 0 or (1<<S)>>1. Clip3 is a clipping operation to clip the prediction value valid. For example, Clip3(x)=max(0, min(MaxValue, x)).
  d. In one example, MaxValue may be defined as (1<<Bitdepth)−1.
  e. In one example, MaxValue may be changed from slice to slice/tile to tile/picture to picture, e.g., it may represent the maximally allowed value for a given color component/a given block/a given CTU/a given CTU row.

Figure 8:
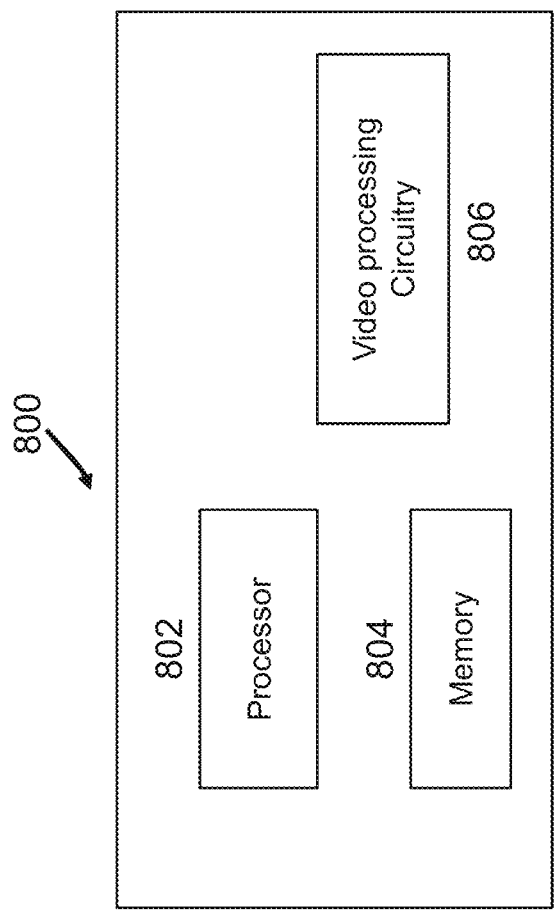
FIG. 8 is a block diagram of an example of a video processing apparatus.

FIG. 8 is a block diagram of a video processing apparatus 800. The apparatus 800 may be used to implement one or more of the methods described herein. The apparatus 800 may be embodied in a smartphone, tablet, computer, Internet of Things (IoT) receiver, and so on. The apparatus 800 may include one or more processors 802, one or more memories 804 and video processing hardware 806. The processor(s) 802 may be configured to implement one or more methods described in the present document. The memory (or memories) 804 may be used for storing data and code used for implementing the methods and techniques described herein. The video processing hardware 806 may be used to implement, in hardware circuitry, some techniques described in the present document.

Figure 10:
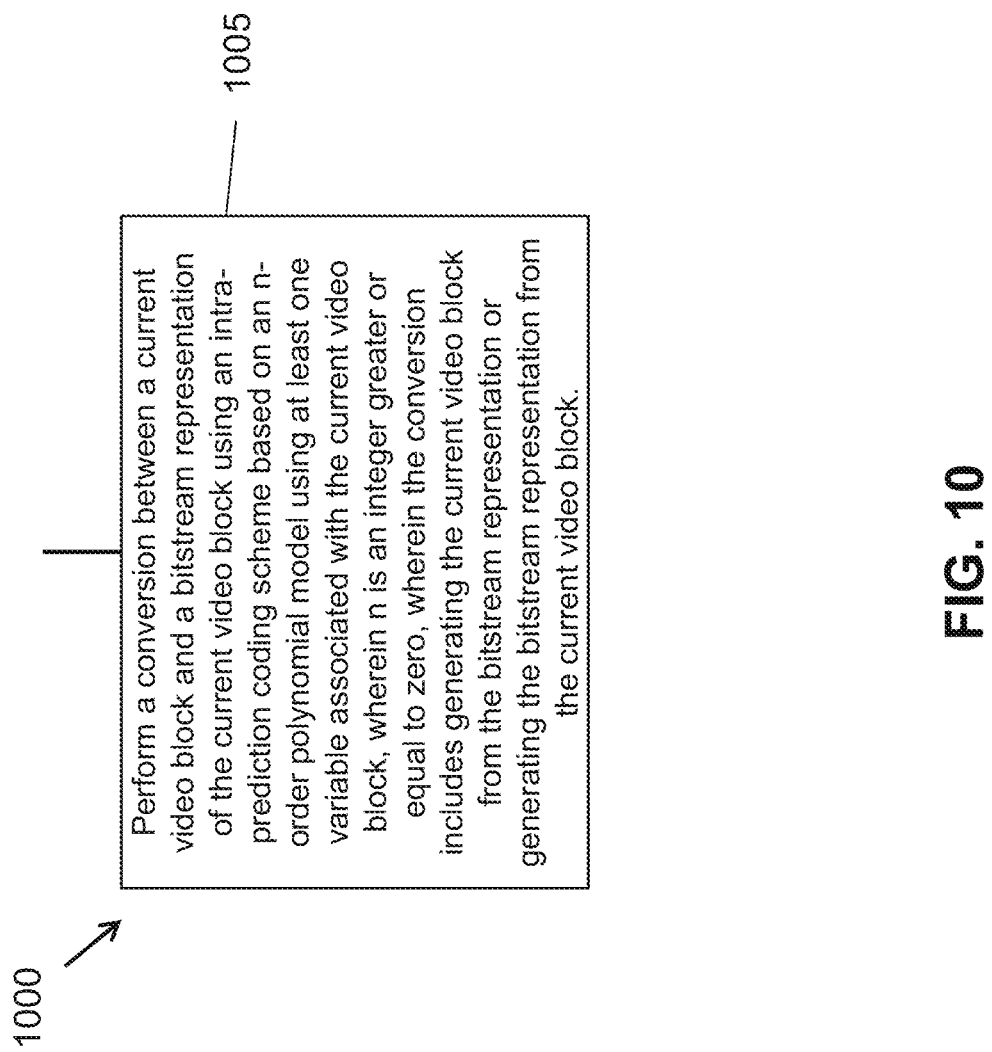
FIG. 10 is a flowchart for an example of a video bitstream processing method.

FIG. 10 is a flowchart for a method 1000 of video processing. The method 1000 includes performing (1005) a conversion between a current video block and a bitstream representation of the current video block using an intra-prediction coding scheme based on an n-order polynomial model using at least one variable associated with the current video block, where n is an integer greater than or equal to zero, wherein the conversion includes generating the current video block from the bitstream representation or generating the bitstream representation from the current video block.

Figure 11:
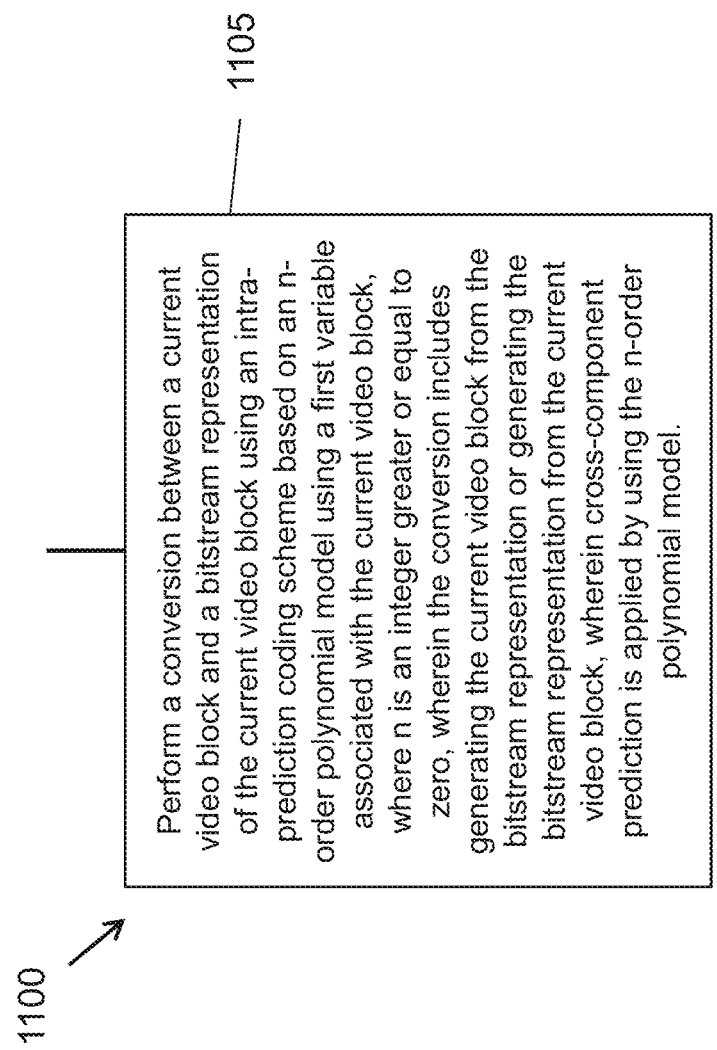
FIG. 11 is a flowchart for an example of a video bitstream processing method.

FIG. 11 is a flowchart for a method 1100 of video processing. The method 1100 includes performing (1105) a conversion between a current video block and a bitstream representation of the current video block using an intra-prediction coding scheme based on an n-order polynomial model using a first variable associated with the current video block, where n is an integer greater than or equal to zero, wherein the conversion includes generating the current video block from the bitstream representation or generating the bitstream representation from the current video block, wherein cross-component prediction is applied by using the n-order polynomial model.

With reference to methods 1000 and 1100, some examples of intra prediction using a polynomial model and their use are described in Section 4 of the present document. For example, as described in Section 4, an n-order polynomial model with one or two variables can be used.

With reference to methods 1000 and 1100, the video block may be encoded in the video bitstream in which bit efficiency may be achieved by using a bitstream generation rule related to intra prediction.

Figure 12:
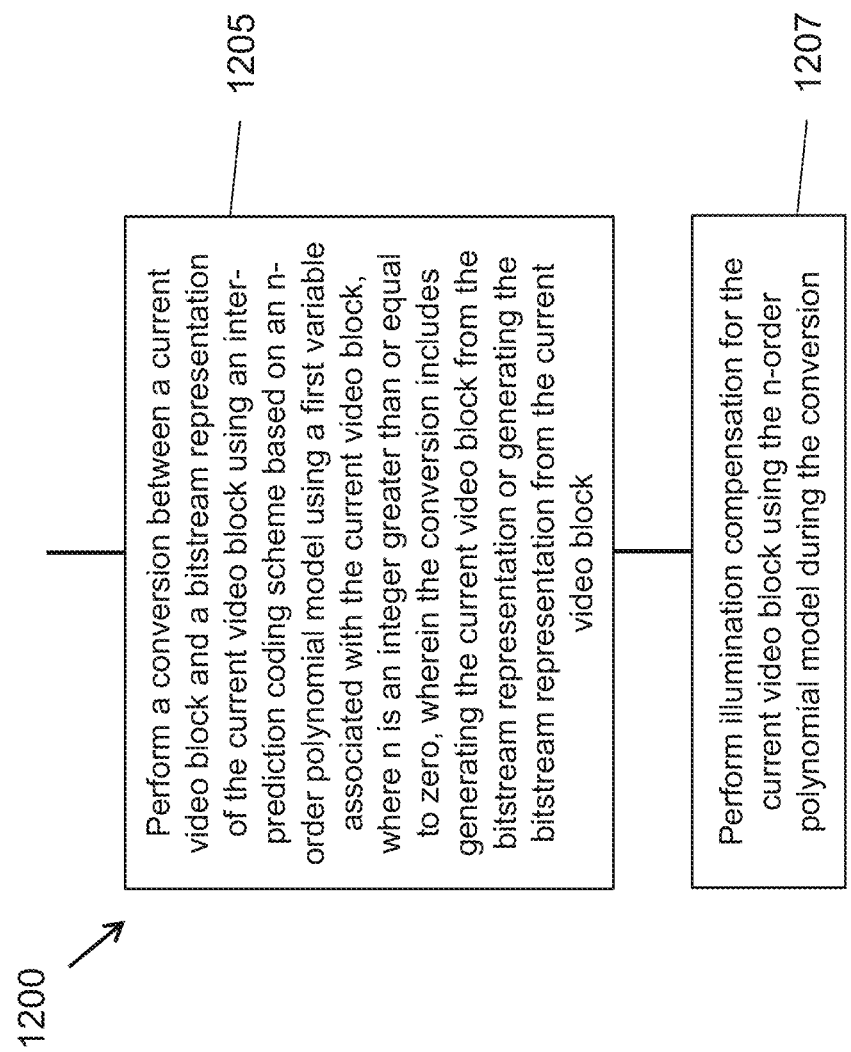
FIG. 12 is a flowchart for an example of a method for processing video.

FIG. 12 is a flowchart for a method 1200 of video processing. The method 1200 includes performing (1205) a conversion between a current video block and a bitstream representation of the current video block using an inter-prediction coding scheme based on an n-order polynomial model using a first variable associated with the current video block, where n is an integer greater than or equal to zero, wherein the conversion includes generating the current video block from the bitstream representation or generating the bitstream representation from the current video block; and performing (1207) illumination compensation for the current video block using the n-order polynomial model during the conversion.

FIG. 13 is a flowchart for a method 1300 of video processing. The method 1300 includes performing (1305) a conversion between a current video block and a bitstream representation of the current video block using an inter-prediction coding scheme based on an n-order polynomial model using a first variable associated with the current video block, where n is an integer greater than or equal to zero, wherein the conversion includes generating the current video block from the bitstream representation or generating the bitstream representation from the current video block; and performing (1307) multi-hypothesis inter prediction using the n-order polynomial model during the conversion.

Various embodiments and techniques described throughout the present document may be described using the following clause based format.

1.1. A method for processing video, comprising: performing a conversion between a current video block and a bitstream representation of the current video block using an intra-prediction coding scheme based on an n-order polynomial model using at least one variable associated with the current video block, where n is an integer greater than or equal to zero, wherein the conversion includes generating the current video block from the bitstream representation or generating the bitstream representation from the current video block.

1.2. The method of example 1.1, wherein the n-order polynomial model uses one variable.

1.3. The method of example 1.2, wherein the one variable represents one of a distance between a sample to be predicted and a left boundary of the current video block along a horizontal direction, a distance between a sample to be predicted and a top boundary of the current video block along a vertical direction, a distance between a sample to be predicted and a left or a top boundary of the current video block along an angular prediction direction.

1.4. The method of example 1.1, wherein the n-order polynomial model uses two variables.

1.5. The method of example 1.4, wherein one variable of the two variables represents a distance between a sample to be predicted and a left boundary of the current video block along a horizontal direction, and another variable of the two variables represents a distance between the sample and a top boundary of the current video block along a vertical direction.

1.6. The method of example 1.4, wherein one variable of the two variables represents a distance between a sample to be predicted and a left or a top boundary of the current video block along an angular prediction direction, and another variable of the two variables represents a distance between the sample and the left or the top boundary of the current video block along a direction perpendicular to the angular prediction direction.

1.7. The method of any of examples 1.1-1.6, wherein multiple sets of parameters are derived for the n-order polynomial model, each of the multiple sets of parameters to be applied to one set of samples of the current video block.

1.8. The method of example 1.7, wherein the one set of samples of the current video block includes samples in a same line along a certain prediction direction.

1.9. The method of any of examples 1.1-1.6, wherein a set of parameters is derived for the n-order polynomial model, wherein the set of parameters are applied to each sample of the current video block.

1.10. The method of any one of examples 1.7-1.9, wherein some parameters of the multiple sets of parameters for the n-order polynomial model are forced to be zeros.

1.11. The method of example 1.2 or 1.3, wherein n is 3, and the n-order polynomial model is $f(x)=a_0+a_1x+a_2x^2+a_3x^3$, wherein x is the one variable.

1.12. The method of example 1.2, wherein n is 2, and the n-order polynomial model is $f(x)=a_0+a_1x+a_2x^2$, wherein x is the one variable.

1.13. The method of any of examples 1.4-1.6, wherein the n-order polynomial model is $$f(x, y) = \sum_{k=0}^{n} a_k x^k + \sum_{k=0}^{n} b_k y^k + \sum_{k=1}^{n-1} c_k x^k y^{n-k},$$

wherein x is one variable of the two variables and y is another variable of the two variables.

1.14. The method of example 1.13, wherein $a_k$ and $b_k$ are derived, and wherein $c_k$ is zero.

1.15. The method of any one of examples 1.11-1.14, wherein f(x) represents predicted sample values of samples of the current video block.

1.16. The method of any of examples 1.7-1.8, wherein a first set of neighboring samples is used to derive a first set of parameters, and a second set of neighboring samples which is different from the first set of neighboring samples is used to derive a second set of parameters which is different from the first set of parameters.

1.17. The method of example 1.16, wherein the n-order polynomial model uses one variable, wherein the first set of neighboring samples are in a first line along a prediction direction and the second set of neighboring samples are in a second line along the prediction direction, wherein the first line is different from the second line.

1.18. The method of example 1.16, wherein the n-order polynomial model uses two variables, wherein the first set of neighboring samples are in a first line along a prediction direction or in lines adjacent to the first line along the prediction direction, and the second set of neighboring samples are in a second line along the prediction direction or in lines adjacent to the second line along the prediction direction.

1.19. The method of any of examples 1.17-1.18, wherein the prediction direction is one of an angular direction, a horizontal direction and a vertical direction.

1.20. The method of any one of examples 1.16-1.19, wherein the samples of the current video block in the first line along a prediction direction is predicted using the first set of parameters and the samples of the current video block in the second line along the prediction direction is predicted using the second set of parameters.

1.21. The method of example 1.16, wherein for a prediction direction, if there are available neighboring samples in both above row and left column in relation to a current sample, different sets of parameters are derived for samples in a prediction line in the prediction direction.

1.22. The method of any of examples 1.16-1.21, wherein, for the n-order polynomial model, n+1 neighboring samples are used to derive parameters of the n-order polynomial model, where n is an integer greater than or equal to zero.

1.23. The method of any of examples 1.16-1.22, wherein for the n-order polynomial model, more than n+1 neighboring samples are used to derive parameters of the n-order polynomial model, where n is an integer greater than or equal to zero.

1.24. The method of any one of examples 1.16-1.23, wherein the first set of neighboring samples includes a first number of samples, and the second set of neighboring samples includes a second number of samples, wherein the first number and the second number are different.

1.25. The method of any of examples 1.16-1.24, wherein one or both of the first set of neighboring samples and the second set of neighboring samples are selected based on at least one of a distance between the neighboring samples and a current sample to be predicted, and the intra-prediction coding scheme that is applied.

1.26. The method of example 1.16, wherein the deriving the first set of parameters and the second set of parameters is based on a determination regarding availability of neighboring reconstructed samples.

1.27. The method of example 1.25, wherein a neighboring sample is determined to be unavailable if it has not been decoded.

1.28. The method of example 1.25, wherein a neighboring sample is determined to be unavailable if it is not in a same slice, a same tile group, a same tile, or a same coding tree unit (CTU) line with the current sample.

1.29. The method of example 1.25, wherein a neighboring sample is determined to be unavailable if it is not intra-coded.

1.30. A method for processing video, comprising: performing a conversion between a current video block and a bitstream representation of the current video block using an intra-prediction coding scheme based on an n-order polynomial model using a first variable associated with the current video block, where n is an integer greater than or equal to zero, wherein the conversion includes generating the current video block from the bitstream representation or generating the bitstream representation from the current video block, wherein cross-component prediction is applied by using the n-order polynomial model.

1.31. The method of example 1.30, wherein the n-order polynomial model is $f(x)=a_0+a_1x+a_2x^2+a_3x^3$ or $f(x)=a_0+a_1x+a_2x^2$, wherein x is the first variable, x represents a sample value of a first color component, and f(x) represents a predicted sample value of a second color component, the first color component and the second color component being different.

1.32. The method of example 1.30, wherein the n-order polynomial model is $f(x)=a_0+a_1x+a_2x^2+a_3x^3$ or $f(x)=a_0+a_1x+a_2x^2$, wherein x is the first variable, and when deriving the parameters of the n-order polynomial model, x represents a neighboring sample values of a first color component of the current video block, and f(x) represents the corresponding neighboring sample values of a second color component of the current video block, the first color component and the second color component being different.

1.33. The method of any of examples 1.30-1.32, wherein neighboring sample values of the first color component and the second color component are processed by filters to generate filtered sample values, and the filtered sample values are used to derive parameters of the n-order polynomial model.

1.34. The method of example 1.30, wherein different parameters are derived for different color components.

1.35. The method of any of examples 1.1-1.34, wherein neighboring samples are processed by filters to generate filtered neighboring samples, and the filtered neighboring samples are used to derive the parameters of the n-order polynomial model.

1.36. The method of any of examples 1.1-1.34, wherein neighboring samples in fractional positions are used for deriving the parameters, and the fractional neighboring samples are interpolated using neighboring samples in integer positions.

1.37. The method of any of examples 1.1-1.34, wherein the parameters of the n-order polynomial model are derived from a color component and used for other color components.

1.38. The method of any of examples 1.1-1.34, wherein the parameters of the n-order polynomial model are fixed for all samples in one block.

1.39. The method of any of examples 1.1-1.34, wherein neighboring samples are downsampled before being used to derive the parameters of the n-order polynomial model.

1.40. The method of any of examples 1.1-1.34, wherein the method is used as a new intra-prediction mode in addition to a current existing intra-prediction mode.

1.41. The method of any of examples 1.1-1.34, wherein the method is used as a new way to derive intra prediction blocks in addition to current existing ways, and wherein for each intra prediction mode, or partial of allowed intra prediction modes, a syntax indicating whether to use the polynomial model-based intra prediction method or not is signaled.

1.42. The method of any of examples 1.1-1.35, wherein a flag that indicates usage of the n-order polynomial model is signaled with a block, a coding unit (CU), a slice header, a tile header, a video parameter set (VPS), a sequence parameter set (SPS), or a picture parameter set (PPS).

1.43. The method of example 1.42, wherein context adaptive arithmetic binary coding is used to encode the flag.

1.44. The method of example 1.43, wherein one or more contexts are used to encode the flag, and when more than one contexts are used, the selection of the contexts are based on the polynomial model flag of neighboring video blocks.

1.45. The method of any of examples 1.42-1.44, wherein the flag further indicates usage of a conventional intra-prediction method or a polynomial model-based intra-prediction method for the current video block.

1.46. The method of any of examples 1.42-1.44, wherein the flag is decoded before decoding an intra-prediction mode, and wherein if the flag indicates that polynomial model-based intra prediction method is used for decoding the current video block, refraining from decoding the intra prediction mode.

1.47. The method of any of examples 1.1-1.34, wherein some parameters of the n-order polynomial model are default values and are not derived.

1.48. The method of any of examples 1.1-1.34, wherein the n-order polynomial model is applied on only luma color components.

1.49. The method of any of examples 1.1-1.34, wherein the n-order polynomial model is used based on a block size or a block shape of the current video block.

1.50. The method of any of examples 1.1-1.34, wherein the method is used for certain intra-prediction modes and disabled for other remaining intra-prediction modes, and when the method is disable, refraining from signaling any indication of the method.

1.51. The method of any of examples 1.1-1.34, wherein the generated value by applying the n-order polynomial model is clipped before being used as prediction value.

1.52. The method of example 1.51, wherein $$f(x) = \text{Clip3}\left(\left(\sum_{k=0}^{n} a_k x^k + \text{off}\right) \gg S\right),$$

and $$f(x, y) = \text{Clip3}\left(\left(\sum_{k=0}^{n} a_k x^k + \sum_{k=0}^{n} b_k y^k + \sum_{k=1}^{n-1} c_k x^k y^{n-k} + \text{off}\right) \gg S\right),$$

where off is 0, or off=2(S−1), and Clip3 is a function to clip a prediction value.

1.53. The method of example 1.52, wherein Clip3(x)=max(0, min(MaxValue, x)), and wherein MaxValue is 2Bitdepth−1 and represents maximally allowed value for a given color component/a given block/a given CTU/a given CTU row.

1.54. The method of example 1.52, wherein Clip3(x)=max(0, min(MaxValue, x)), and wherein MaxValue is changed from slice to slice, or from tile to tile, or from picture to picture, wherein MaxValue represents maximally allowed value for a given color component/a given block/a given CTU/a given CTU row.

1.55. A video decoding apparatus comprising a processor configured to implement a method recited in one or more of examples 1.1 to 1.54.

1.56. A video encoding apparatus comprising a processor configured to implement a method recited in one or more of examples 1.1 to 1.54.

1.57. A computer program product having computer code stored thereon, the code, when executed by a processor, causes the processor to implement a method recited in any of examples 1.1 to 1.54.

2.1. A method for processing video, comprising: performing a conversion between a current video block and a bitstream representation of the current video block using an inter-prediction coding scheme based on an n-order polynomial model using a first variable associated with the current video block, where n is an integer greater than or equal to zero, wherein the conversion includes generating the current video block from the bitstream representation or generating the bitstream representation from the current video block; and performing illumination compensation for the current video block using the n-order polynomial model during the conversion.

2.2. The method of example 2.1, wherein n is 3, and the n-order polynomial model is $f(x)=a_0+a_1x+a_2x^2+a_3x^3$, wherein $a_i$, where $i=0, 1, 2, 3$, is a parameter of the n-order polynomial model, and x is the first variable.

2.3. The method of example 2.1, wherein n is 2, and the n-order polynomial model is $f(x)=a_0+a_1x+a_2x^2$, wherein $a_i$, where $i=0, 1, 2$, is a parameter of the n-order polynomial model, and x is the first variable.

2.4. The method of example 2.2 or example 2.3, wherein x represents a reference sample value of a first sample of the current video block, and f(x) represents a predicted sample value of the first sample.

2.5. The method of example 2.2 or example 2.3, wherein the parameters are derived using at least one reconstructed value of at least one second sample and at least one reference sample of the at least one second sample based on the n-order polynomial model, and wherein the second sample is a neighboring sample of the current video block.

2.6. The method of example 2.5, wherein when deriving the parameters, f(x) represents the reconstructed value of the second sample, and x represents a reference sample value of the second sample, and wherein the reference sample is identified by a motion vector (MV) of the current video block.

2.7. The method of example 2.5, wherein when deriving the parameters, f(x) represents the reconstructed value of the second sample, and x represents a reference sample value of the second sample, wherein the reference sample of the second sample is identified by a modified value of a MV of the current video block.

2.8. The method of example 2.7, wherein the modified value is the integer part of the MV.

2.9. The method of any of examples 2.5-2.8, wherein the reconstructed value and the reference sample value of the second samples are processed by filters to generate filtered sample values, and the filtered sample values are used to derive the parameters of the n-order polynomial model.

2.10. The method of any of examples 2.1-2.9, wherein different parameters are derived for different color components.

2.11. A method for processing video, comprising: performing a conversion between a current video block and a bitstream representation of the current video block using an inter-prediction coding scheme based on an n-order polynomial model using a first variable associated with the current video block, where n is an integer greater than or equal to zero, wherein the conversion includes generating the current video block from the bitstream representation or generating the bitstream representation from the current video block; and performing multi-hypothesis inter prediction using the n-order polynomial model during the conversion.

2.12. The method of example 2.11, wherein n is 3, and the n-order polynomial model is $f(x)=a_0+a_1x+a_2x^2+a_3x^3$, wherein $a_i$, where $i=0, 1, 2, 3$, is a parameter of the n-order polynomial model, and x is the first variable.

2.13. The method of example 2.11, wherein n is 2, and the n-order polynomial model is $f(x)=a_0+a_1x+a_2x^2$, wherein $a_i$, where $i=0, 1, 2$, is a parameter of the n-order polynomial model, and x is the first variable.

2.14. The method of example 2.12 or example 2.13, wherein x represents a temporal distance between a reference picture and a current picture related to the current video block, and f(x) represents a predicted sample value of a color component.

2.15. The method of example 2.12 or 2.13, wherein the parameters of the n-order polynomial model are derived using reference sample values of multiple reference blocks of the current video block and multiple temporal distances each of which is a temporal distance between one reference picture related to one of the multiple reference blocks and a current picture related to the current video block.

2.16. The method of example 2.12 or example 2.13, wherein the parameters of the n-order polynomial model are derived using reference sample values of multiple reference blocks of the current video block and the temporal distance between different reference pictures related to the multiple reference blocks.

2.17. The method of example 2.15 or example 2.16, wherein the reference sample values are processed by filters to generate filtered sample values, and the filtered sample values are used to derive the parameters of the n-order polynomial model.

2.18. The method of any one of examples 2.12-2.17, wherein different parameters of the n-order polynomial model are derived for different color components.

2.19. A video decoding apparatus comprising a processor configured to implement a method recited in one or more of examples 2.1 to 2.18.

2.20. A video encoding apparatus comprising a processor configured to implement a method recited in one or more of examples 2.1 to 2.18.

2.21. A computer program product having computer code stored thereon, the code, when executed by a processor, causes the processor to implement a method recited in any of examples 2.1 to 2.18.

It will be appreciated that the disclosed techniques may be embodied in video encoders or decoders to improve compression efficiency.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, which is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

The invention claimed is:

1. A method for processing video, comprising:
performing a conversion between a current video block and a bitstream of the current video block using an intra-prediction coding scheme based on an n-order polynomial model using at least one variable associated with the current video block, where n is an integer greater than one, wherein the conversion includes generating the current video block from the bitstream or generating the bitstream from the current video block,
wherein multiple sets of parameters are derived for the n-order polynomial model, and wherein each of the multiple sets of parameters is to be applied to one set of samples or each sample of the current video block.

2. The method of claim 1, wherein the n-order polynomial model uses one variable or two variables.

3. The method of claim 2, wherein,
when the n-order polynomial model uses the one variable, the one variable represents one of a distance between a sample to be predicted and a left boundary of the current video block along a horizontal direction, a distance between a sample to be predicted and a top boundary of the current video block along a vertical direction, or a distance between a sample to be predicted and a left or a top boundary of the current video block along an angular prediction direction,
when the n-order polynomial model uses two variables, a first variable of the two variables represents a distance between a sample to be predicted and a left boundary of the current video block along a horizontal direction, and a second variable of the two variables represents a distance between the sample and a top boundary of the current video block along a vertical direction; or
the first variable of the two variables represents a distance between a sample to be predicted and a left or a top boundary of the current video block along an angular prediction direction, and the second variable of the two variables represents a distance between the sample and the left or the top boundary of the current video block along a direction perpendicular to the angular prediction direction.

4. The method of claim 2, wherein,
when the n-order polynomial model uses the one variable, n is 3, and the n-order polynomial model is $f(x)=a_0+a_1x+a_2x^2+a_3x^3$, wherein x is the one variable, or
n is 2, and the n-order polynomial model is $f(x)=a_0+a_1x+a_2x^2$, wherein x is the one variable, when the n-order polynomial model uses two variables, the n-order polynomial model is $$f(x, y) = \sum_{k=0}^{n} a_k x^k + \sum_{k=0}^{n} b_k y^k + \sum_{k=1}^{n-1} c_k x^k y^{n-k},$$

wherein x is a first variable of the two variables and y is a second variable of the two variables.

5. The method of claim 4 wherein $a_k$ and $b_k$ are derived, and wherein $c_k$ is zero.

6. The method of claim 1, wherein the one set of samples of the current video block includes samples in a same line along a certain prediction direction.

7. The method of claim 1, wherein,
the n-order polynomial model uses one variable, wherein a first set of neighboring samples are in a first line along a prediction direction and a second set of neighboring samples are in a second line along the prediction direction, wherein the first line is different from the second line; or
the n-order polynomial model uses two variables, wherein the first set of neighboring samples are in a first line along a prediction direction or in lines adjacent to the first line along the prediction direction, and the second set of neighboring samples are in a second line along the prediction direction or in lines adjacent to the second line along the prediction direction.

8. The method of claim 7, wherein the samples of the current video block in the first line along a prediction direction is predicted using a first set of parameters and the samples of the current video block in the second line along the prediction direction is predicted using a second set of parameters.

9. The method of claim 1, wherein for a prediction direction, if there are available neighboring samples in both above row and left column in relation to a current sample, different sets of parameters are derived for samples in a prediction line in the prediction direction.

10. The method of claim 1, wherein, for the n-order polynomial model, n+1 neighboring samples or more than n+1 neighboring samples are used to derive parameters of the n-order polynomial model.

11. The method of claim 1, wherein one or both of a first set of neighboring samples and a second set of neighboring samples are selected based on at least one of a distance between the neighboring samples and a current sample to be predicted, and the intra-prediction coding scheme that is applied.

12. The method of claim 1, wherein the deriving a first set of parameters and a second set of parameters is based on a determination regarding availability of neighboring reconstructed samples, wherein a neighboring sample is determined to be unavailable under one of the following conditions, (1) if it has not been decoded, (2) if it is not in a same slice, a same tile group, a same tile, or a same coding tree unit (CTU) line with the current sample, (3) if it is not intra-coded.

13. The method of claim 1, wherein a value generated by applying the n-order polynomial model is clipped before being used as prediction value.

14. The method of claim 13, wherein $$f(x) = \text{Clip3}\left(\left(\sum_{k=0}^{n} a_k x^k + \text{off}\right) \gg S\right),$$

and $$f(x, y) = \text{Clip3}\left(\left(\sum_{k=0}^{n} a_k x^k + \sum_{k=0}^{n} b_k y^k + \sum_{k=1}^{n-1} c_k x^k y^{n-k} + \text{off}\right) \gg S\right),$$

where off is 0, or off=$2^{(S-1)}$, and Clip3 is a function to clip the prediction value.

15. The method of claim 14, wherein Clip3(x)=max(0, min(MaxValue, x)), and wherein MaxValue is $2^{Bitdepth}-1$ or MaxValue is changed from slice to slice, or from tile to tile, or from picture to picture and represents maximally allowed value for a given color component/a given block/a given CTU/a given CTU row.

16. A video processing apparatus comprising a processor and a non-transitory memory with instructions thereon, wherein the instructions upon execution by the processor, cause the processor to:
perform a conversion between a current video block and a bitstream of the current video block using an intra-prediction coding scheme based on an n-order polynomial model using at least one variable associated with the current video block, where n is an integer greater than one, wherein the conversion includes generating the current video block from the bitstream or generating the bitstream from the current video block,
wherein multiple sets of parameters are derived for the n-order polynomial model, and wherein each of the multiple sets of parameters is to be applied to one set of samples or each sample of the current video block.

17. The video processing apparatus of claim 16, wherein the n-order polynomial model uses one variable or two variables.

18. The video processing apparatus of claim 17, wherein,
when the n-order polynomial model uses the one variable, the one variable represents one of a distance between a sample to be predicted and a left boundary of the current video block along a horizontal direction, a distance between a sample to be predicted and a top boundary of the current video block along a vertical direction, or a distance between a sample to be predicted and a left or a top boundary of the current video block along an angular prediction direction,
when the n-order polynomial model uses two variables, a first variable of the two variables represents a distance between a sample to be predicted and a left boundary of the current video block along a horizontal direction, and a second variable of the two variables represents a distance between the sample and a top boundary of the current video block along a vertical direction; or
the first variable of the two variables represents a distance between a sample to be predicted and a left or a top boundary of the current video block along an angular prediction direction, and the second variable of the two variables represents a distance between the sample and the left or the top boundary of the current video block along a direction perpendicular to the angular prediction direction.

19. The video processing apparatus of claim 16, wherein the one set of samples of the current video block includes samples in a same line along a certain prediction direction.

20. A non-transitory computer-readable recording medium storing a bitstream of a video which is generated by a method performed by a video processing apparatus, wherein the method comprises:

generating the bitstream using an intra-prediction coding scheme based on an n-order polynomial model using at least one variable associated with a current video block, where n is an integer greater than one, wherein multiple sets of parameters are derived for the n-order polynomial model, and wherein each of the multiple sets of parameters is to be applied to one set of samples or each sample of the current video block.

* * * * *